United States Patent
Tsuda et al.

(10) Patent No.: US 11,796,807 B2
(45) Date of Patent: Oct. 24, 2023

(54) HEAD-UP DISPLAY DEVICE AND HEAD-UP DISPLAY SYSTEM

(71) Applicant: KOITO MANUFACTURING CO., LTD., Tokyo (JP)

(72) Inventors: Toshiaki Tsuda, Shizuoka (JP); Yuichi Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/618,264

(22) PCT Filed: Jun. 10, 2020

(86) PCT No.: PCT/JP2020/022897
§ 371 (c)(1),
(2) Date: Dec. 10, 2021

(87) PCT Pub. No.: WO2020/250941
PCT Pub. Date: Dec. 17, 2020

(65) Prior Publication Data
US 2022/0350139 A1 Nov. 3, 2022

(30) Foreign Application Priority Data

Jun. 11, 2019 (JP) .................................. 2019-108333
Jun. 20, 2019 (JP) .................................. 2019-114849

(51) Int. Cl.
*G02B 27/01* (2006.01)
*B60K 35/00* (2006.01)
*G09G 3/00* (2006.01)

(52) U.S. Cl.
CPC .......... *G02B 27/0101* (2013.01); *B60K 35/00* (2013.01); *G02B 27/0149* (2013.01);
(Continued)

(58) Field of Classification Search
CPC ............ B60K 35/00; B60K 2370/1529; B60K 2370/188; B60K 2370/334;
(Continued)

(56) References Cited

U.S. PATENT DOCUMENTS 5,963,280 A 10/1999 Okuda et al.
6,144,424 A 11/2000 Okuda et al.
(Continued)

FOREIGN PATENT DOCUMENTS

JP 9330609 A 12/1997
JP 2005338325 A 12/2005
(Continued)

OTHER PUBLICATIONS

International Search Report (PCT/ISA/210) dated Aug. 18, 2020 issued by the International Searching Authority in International Application No. PCT/JP2020/022897.
(Continued)

*Primary Examiner* — Nitin Patel
*Assistant Examiner* — Cory A Almeida
(74) *Attorney, Agent, or Firm* — Sughrue Mion, PLLC

(57) ABSTRACT

A head-up display device is provided in a vehicle together with a headlamp. The head-up display device includes a light source, a control unit, and a projection unit. The light source emits white light whose correlated color temperature is changeable. The control unit adjusts the correlated color temperature of the white light emitted from the light source. The projection unit forms image light by the white light emitted from the light source. The projection unit projects the image light onto a projection target member disposed in front of a driver of the vehicle, thereby displaying a virtual image superimposed on a landscape for the driver. The control unit adjusts the correlated color temperature of the white light emitted from the light source in accordance with
(Continued)

a correlated color temperature of irradiation light emitted from the headlamp.

10 Claims, 22 Drawing Sheets

(52) U.S. Cl.
 CPC ...... *G09G 3/002* (2013.01); *B60K 2370/1529* (2019.05); *B60K 2370/334* (2019.05); *B60K 2370/52* (2019.05); *G02B 2027/0154* (2013.01); *G09G 2320/0666* (2013.01); *G09G 2380/10* (2013.01)

(58) Field of Classification Search
 CPC .... B60K 2370/52; B60Q 1/0011; B60Q 1/04; B60Q 9/00; B60Q 2400/50; B60R 11/0229; G01C 21/365; G02B 27/0101; G02B 27/0149; G02B 2027/0154; G02B 27/01; G08G 1/0962; G08G 1/166; G09G 3/002; G09G 2320/0666; G09G 2380/10
 See application file for complete search history.

(56) References Cited

U.S. PATENT DOCUMENTS

| | | | | |
|---|---|---|---|---|
| 2007/0279755 | A1* | 12/2007 | Hitschmann | G02B 27/0101 359/630 |
| 2014/0253579 | A1* | 9/2014 | Babaguchi | G09G 3/002 345/590 |
| 2017/0230628 | A1 | 8/2017 | Ichikawa et al. | |
| 2017/0337821 | A1 | 11/2017 | Masuda et al. | |
| 2019/0004313 | A1 | 1/2019 | Kusafuka et al. | |
| 2019/0051185 | A1 | 2/2019 | Masuda et al. | |
| 2020/0180502 | A1 | 6/2020 | Mitsuya et al. | |

FOREIGN PATENT DOCUMENTS

| | | | | | |
|---|---|---|---|---|---|
| JP | 2008268680 | A | | 11/2008 | |
| JP | 2010032906 | A | | 2/2010 | |
| JP | 2010149734 | A | | 7/2010 | |
| JP | 2015123855 | A | * | 7/2015 | .......... F21S 48/1145 |
| JP | 2015123855 | A | | 7/2015 | |
| JP | 201655691 | A | | 4/2016 | |
| JP | 2016101771 | A | | 6/2016 | |
| JP | 2017142491 | A | | 8/2017 | |
| JP | 2018136698 | A | * | 8/2018 | |
| JP | 2018136698 | A | | 8/2018 | |
| JP | 6557843 | B1 | | 8/2019 | |
| WO | 2017060966 | A1 | | 4/2017 | |

OTHER PUBLICATIONS

Written Opinion (PCT/ISA/237) dated Aug. 18, 2020 issued by the International Searching Authority in International Application No. PCT/JP2020/022897.

Communication dated Jun. 9, 2022 issued by the European Patent Office in application No. 20822839.5.

* cited by examiner

HEAD-UP DISPLAY DEVICE AND HEAD-UP DISPLAY SYSTEM

TECHNICAL FIELD

The present disclosure relates to a head-up display device and a head-up display system mounted on a vehicle.

BACKGROUND ART

Patent Literature 1 discloses a head-up display device as one unit for providing information such as route guidance and obstacle warning to a driver of a vehicle. The head-up display device projects image light onto a projection target member disposed in front of the driver, thereby displaying a virtual image superimposed on a landscape for the driver. As a result, movement of a line of sight can be minimized at the time of visual recognition of the information.

Patent Literature 1 also discloses that a variable light distribution device capable of freely changing a light distribution pattern is mounted on the vehicle together with the head-up display device.

CITATION LIST

Patent Literature

Patent Literature 1: JP-A-2016-55691

SUMMARY OF INVENTION

Technical Problem

When the image light (virtual image) of the head-up display device is superimposed on irradiation light of a headlamp, both the irradiation light and the image light are basically white light. Since the driver visually recognizes the virtual image superimposed on the landscape in front of the vehicle, the image light may become protective coloration of the irradiation light and may become difficult to see.

In addition, in a case where the headlamp is a variable light distribution device capable of freely changing a light distribution pattern, irradiation light of the headlamp and a display of the head-up display device may overlap each other, and thus visibility of the display of the head-up display device may be affected.

An object of the present disclosure is to provide a head-up display device and a head-up display system that allow a driver to visually recognize information easily.

Another object of the present disclosure is to provide information by a head-up display system in a form that is easily visible to a driver.

Solution to Problem

An aspect of the present disclosure is a head-up display device provided in a vehicle together with a headlamp, the head-up display device including:

a light source configured to emit white light whose correlated color temperature is changeable;

a control unit configured to adjust the correlated color temperature of the white light emitted from the light source; and a projection unit configured to form image light by the white light emitted from the light source, and to project the image light onto a projection target member disposed in front of a driver of the vehicle, thereby displaying a virtual image superimposed on a landscape for the driver.

The control unit adjusts the correlated color temperature of the white light emitted from the light source in accordance with a correlated color temperature of irradiation light emitted from the headlamp. According to this aspect, even when both the image light of the head-up display device and the irradiation light of the headlamp have white basic light, a difference in color tone can be made. As a result, ease of recognizing information displayed by the head-up display device can be improved.

The control unit may adjust the correlated color temperature of the white light emitted from the light source to be different from the correlated color temperature of the irradiation light emitted from the headlamp by 1000 K or more. According to this aspect, since the correlated color temperature of the image light and the correlated color temperature of the irradiation light can be made different to such an extent that the driver can clearly recognize the difference in color tone, ease of recognition can be reliably imparted to the image light, which is necessary information.

The control unit may adjust the correlated color temperature of the white light emitted from the light source to be 4000 K or less. According to this aspect, the image light of the head-up display device has a slightly yellowish color, while the irradiation light of the headlamp is usually white light that is easily visible. As a result, the ease of recognizing the image light can be improved while visibility provided by the headlamp can be ensured.

The control unit may adjust the correlated color temperature of the white light emitted from the light source to be always lower than the correlated color temperature of the irradiation light emitted from the headlamp. According to this aspect, since the correlated color temperature of the irradiation light irradiated by the headlamp is high, a field of view in front of the vehicle is easily ensured. In addition, eye fatigue is reduced as the correlated color temperature becomes lower. Therefore, a color tone of the irradiation light of the headlamp is kept unchanged and the correlated color temperature of the image light is lowered at the time of making the difference in color tone, and thus advantages of both the irradiation light and the image light can be utilized in a well-balanced manner.

The control unit may adjust the correlated color temperature of the white light emitted from the light source only when the headlamp is lighted. According to this aspect, in a case where the headlamp is not lighted and there is no concern that the image light of the head-up display device and the irradiation light of the headlamp overlap with each other, easily recognizable white light can be used as the image light, and in a case where the headlamp is lighted, the difference in color tone can be made. As a result, the correlated color temperature can be accurately adjusted depending on the situation.

A photoconductor that guides the white light emitted from the light source to the projection unit may be included, and the light source may be accommodated in a light engine where a light source of the head lamp is accommodated. According to this aspect, by using the light engine, a function of cooling the light source of the head-up display device and the light source of the headlamp and the like can be integrated at one place. In addition, the correlated color temperature can be efficiently controlled in association with the headlamp and the head-up display device.

The control unit may adjust the correlated color temperature of the white light emitted from the light source in accordance with the correlated color temperature of the irradiation light emitted from the headlamp and a color of an object irradiated by the irradiation light emitted from the headlamp. According to this aspect, visibility of head-up display information can be further improved.

Another aspect of the present disclosure is a head-up display system mounted on a vehicle, including:

a headlamp configured to irradiate a front side of the vehicle; and a head-up display device that includes a light source configured to emit white light whose correlated color temperature is changeable, a control unit configured to adjust the correlated color temperature of the white light emitted from the light source, and a projection unit configured to form image light by the white light emitted from the light source, and to project the image light onto a projection target member disposed in front of a driver of the vehicle, thereby displaying a virtual image superimposed on a landscape for the driver.

The control unit adjusts the correlated color temperature of the white light emitted from the light source in accordance with a correlated color temperature of irradiation light emitted from the headlamp. According to this aspect, similarly to the above, since the difference in color tone of light can be made, the ease of recognizing the information displayed by the head-up display device can be improved.

An aspect of the present disclosure is a head-up display system including:

an environment acquisition device configured to acquire information on a vehicle;

a variable light distribution device configured to form a desired light distribution pattern around the vehicle;

a light distribution control unit configured to determine a light distribution mode and control the variable light distribution device;

a head-up display device configured to project desired information as image light onto a projection target member disposed in front of a driver of the vehicle, thereby displaying a virtual image superimposed on a landscape for the driver; and an image light control unit configured to determine a form and a projection position of the image light and to control the head-up display device.

The light distribution control unit controls the variable light distribution device so as to form a bright portion that has higher luminous intensity or a dark portion that has lower luminous intensity than other regions in the light distribution pattern in accordance with the information on the vehicle, and the image light control unit changes the form of the image light corresponding to the bright portion or the dark portion formed in the light distribution pattern.

The information on the vehicle may include information on the vehicle itself and information on surroundings of the vehicle. According to this aspect, for example, when an object of attention is detected from the information acquired by the environment acquisition device, luminous intensity of the light distribution pattern is partially changed with respect to the object of attention, and, further, an information display provided by the image light at a position where the change is performed is made different from a form of other regions. As a result, information that is important to the driver can be captured in a way that attracts attention of the driver from both the light distribution pattern and the image light.

The head-up display system may further include:

a color evaluation unit configured to specify a representative color based on a color distribution.

The color evaluation unit may specify a representative color of a place where the bright portion or the dark portion is projected around the vehicle based on the information on the vehicle, and the image light control unit may be configured to display at least a part of a color of the image light projected corresponding to the bright portion or the dark portion as information for alerting the driver in a color opposite to the representative color specified by the color evaluation unit. According to this aspect, the information can be displayed in the color opposite to the color tone of the portion in which the luminous intensity of the light distribution pattern is changed. As a result, the information can be conspicuous due to a complementary color effect, and the information necessary for the driver can be visually recognized easily.

The head-up display system may further include:

a light engine including a light source that emits light; and a photoconductor configured to supply light emitted from the light source of the light engine to the variable light distribution device and the head-up display device. By sharing and concentrating light sources of the variable light distribution device and the head-up display device at one place, heat dissipation is easily controlled.

Advantageous Effects of Invention

According to the present disclosure, the head-up display device and the head-up display system that allow the driver to visually recognize information easily can be provided.

According to the present disclosure, the information can be provided by the head-up display system in a form that is easily visible to the driver.

DESCRIPTION OF EMBODIMENTS

Hereinafter, preferred embodiments of the present disclosure will be described with reference to the drawings. The embodiments are not intended to limit the scope of the present invention and are merely for illustration, and all features described in the embodiments and combinations thereof are not necessarily essential features of the present invention.

In each of the drawings, each direction of a vehicle and components thereof (up: down: left: right: front: rear=Up: Lo: Le: Ri: Fr: Re) will be described on an assumption that a driver views from a driver seat of the vehicle.

First Embodiment (Outline of Head-Up Display Device)

Figure 1:
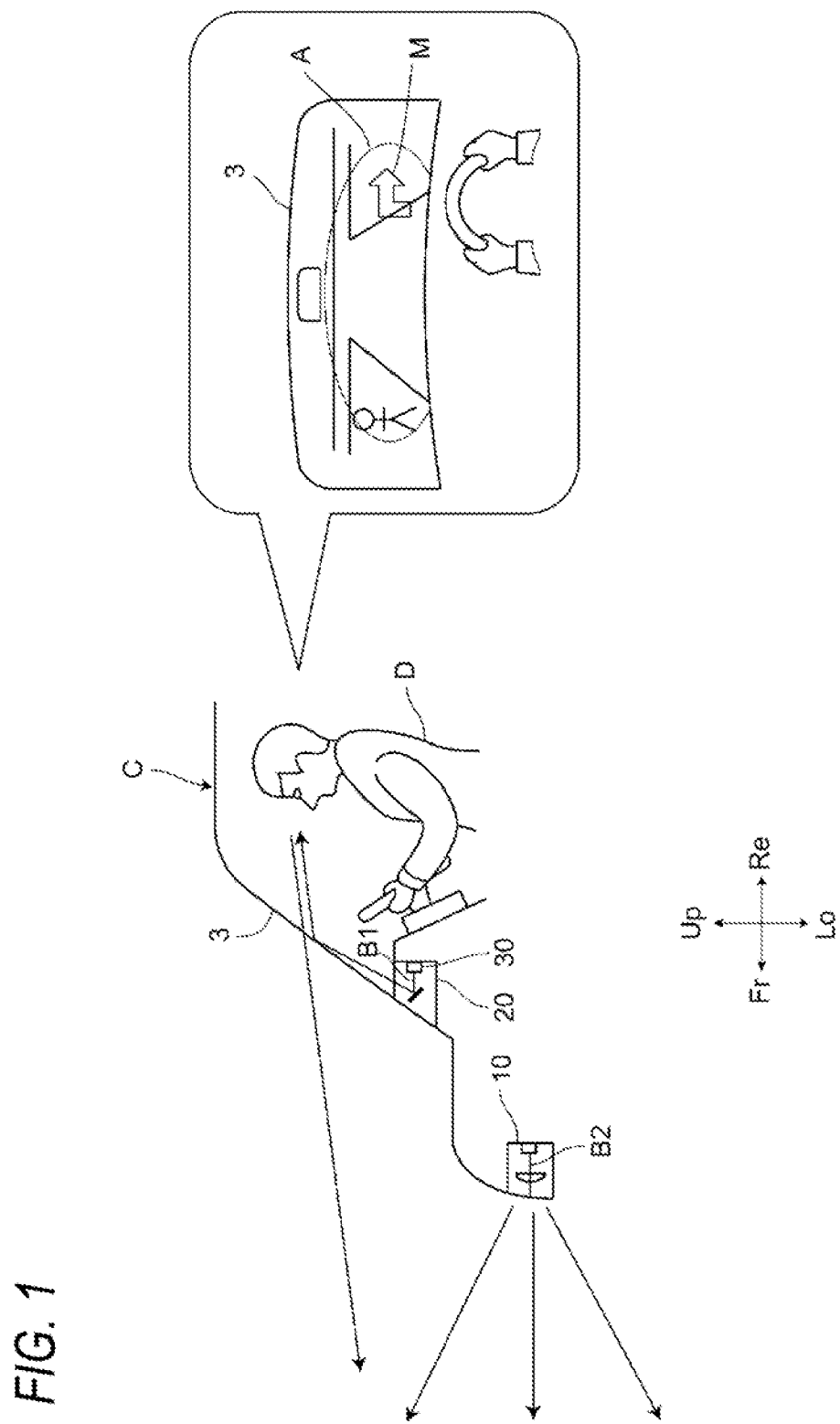
FIG. 1 is a schematic view showing a head-up display device according to a first embodiment.

FIG. 1 is an explanatory diagram showing an outline of a head-up display device 20 according to a first embodiment. The head-up display device 20 is mounted on a vehicle C that includes a headlamp 10.

The headlamp 10 includes a light source. The light source emits irradiation light B2. The headlamp 10 forms a desired light distribution pattern such as a low beam light distribution or a high beam light distribution by the irradiation light B2, and projects the light distribution pattern toward the front of the vehicle C. As the headlamp 10, a configuration known in related art such as a projector type headlamp or a reflector type headlamp is used, and the type thereof is not limited.

The head-up display device 20 includes a light source module 30, and the light source module 30 emits white light B1. The light source module 30 is an example of a light source. As will be described in detail later, a correlated color temperature of the white light B1 emitted by the light source module 30 is configured to be adjustable.

The head-up display device 20 projects images of various types of traveling information, which is mainly effective for a driving operation of a driver D, as image light formed by the white light B1 on a predetermined display region of a projection target member provided in front of the driver seat. In the present embodiment, the predetermined display region of the projection target member is a predetermined region of a windshield 3. The image light projected onto the predetermined region of the windshield 3 is displayed so as to be superimposed on a landscape seen from the driver seat through the windshield 3.

Hereinafter, an image formed by light projected by the head-up display device 20 and visually recognized as a virtual image by the driver D is referred to as image light.

A right side of FIG. 1 shows an example of the head-up display device 20. A high beam light distribution A is formed by the headlamp 10, and is projected to the front of the vehicle C. An arrow M, which is image light indicating a traveling direction, is projected on the windshield 3 by the head-up display device 20. The driver D visually recognizes the arrow M as a virtual image superimposed on a landscape in front of the vehicle C through the windshield 3.

Here, the landscape in front of the vehicle C is irradiated by the high beam light distribution A, in other words, the driver D visually recognizes the arrow M superimposed on the high beam light distribution A.

The arrow M formed by the white light B1 and the high beam light distribution A formed by the irradiation light B2 have the same basic color, which is white. Therefore, in order to prevent a color of the arrow M from becoming protective coloration of the high beam light distribution A and prevent visibility thereof from decreasing, the correlated color temperature of the white light B1 is adjusted in accordance with a correlated color temperature of the irradiation light B2.

With such a configuration, a difference in color tone of the arrow M relative to the high beam light distribution A becomes clear, and the arrow M, which is useful information, is shown in a form that is easily recognized by the driver D.

(Configuration of Head-Up Display Device)

Figure 2:
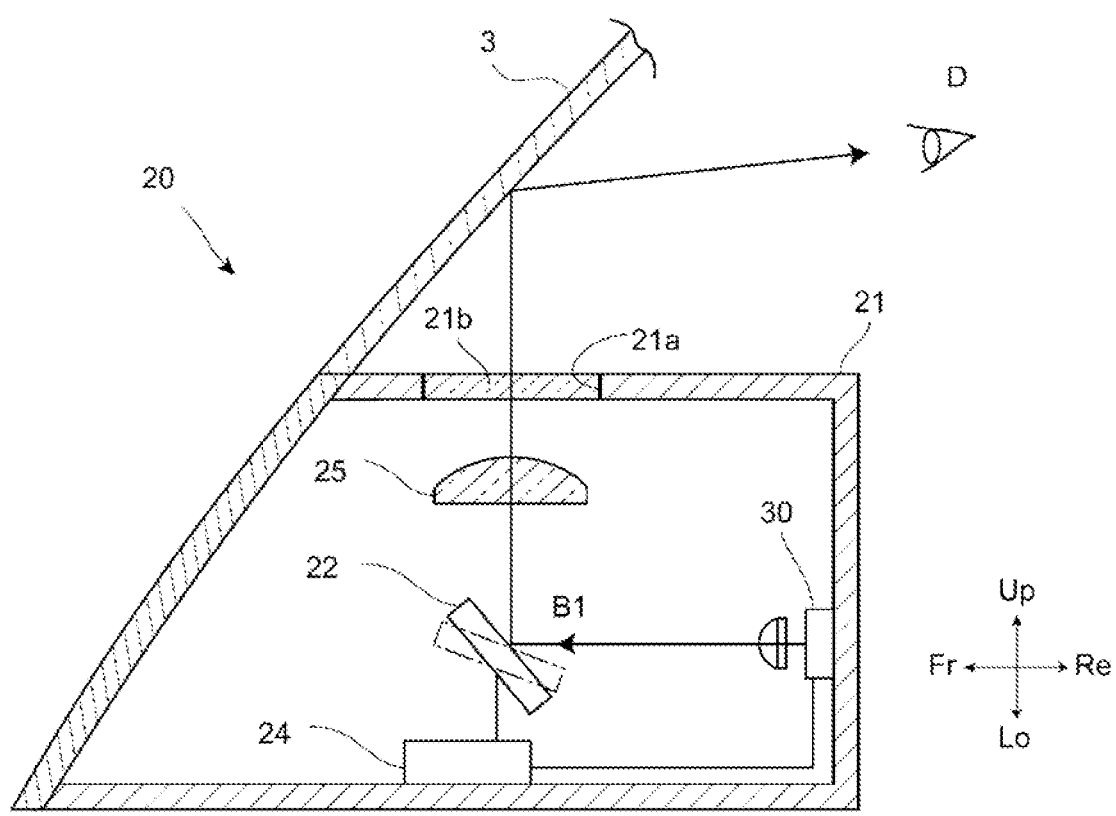
FIG. 2 is a cross-sectional view showing a configuration of the head-up display device.

FIG. 2 is a cross-sectional view showing a configuration of the head-up display device 20. The head-up display device 20 is housed in a housing 21 and is installed in front of the driver seat, such as on a dashboard. In the housing 21, the head-up display device 20 includes a scanning mechanism 22, the light source module 30, a control unit 24, and a projection lens 25. The scanning mechanism 22 and the projection lens 25 are an example of a projection unit.

The projection lens 25 is a plano-convex aspheric lens whose incident surface on a bottom surface side is a flat surface and whose emission surface on an upper surface side is a convex surface. The projection lens 25 is provided to project desired image light formed by the scanning mechanism 22 onto the predetermined display region on the windshield 3 in a specific size. An opening 21a is provided in an upper wall of the housing 21, and allows light from the projection lens 25 to pass therethrough. A translucent cover 21b that transmits light may be provided to cover the opening 21a.

The scanning mechanism 22 is a scanning device including a reflector capable of tilting about two axes. The scanning mechanism 22 is disposed at a position where the white light B1 emitted from the light source module 30 can be reflected to the projection lens 25 by the reflector. The scanning mechanism 22 scans the incident surface of the projection lens 25 with the white light B1 at high speed by reciprocating movement of the reflector. The control unit 24 controls tilt of the scanning mechanism 22 and controls lighting of the light source module 30 in accordance with the scanning of the white light B1, so that desired image light is formed by stacking of light.

The image light formed in this manner is inverted vertically and horizontally via the projection lens 25 and projected onto the windshield 3, and is visually recognized by the driver D as a virtual image formed in front of the vehicle C. As a result, the driver D can visually recognize the image light without moving a line of sight during driving of the vehicle C.

The control unit 24 integrally controls the head-up display device 20. For example, the control unit 24 determines a shape of the image light and a position where the image light is projected, adjusts timing and luminance of lighting of the light source module 30, controls a driving direction and speed of the reflector of the scanning mechanism 22, and the like.

In the present embodiment, the head-up display device 20 includes the scanning mechanism 22. However, the head-up display device 20 may use another configuration instead of the scanning mechanism 22, such as other mechanisms known in related art, as long as the head-up display device 20 can form image light by light as desired. The other mechanisms known in the related art include, for example, a pixel optical device such as an LED array or a liquid crystal shutter in which a plurality of light sources are arranged in a matrix, and a light deflection device such as a digital mirror device (DMD).

(Light Source Module)

Figure 3:
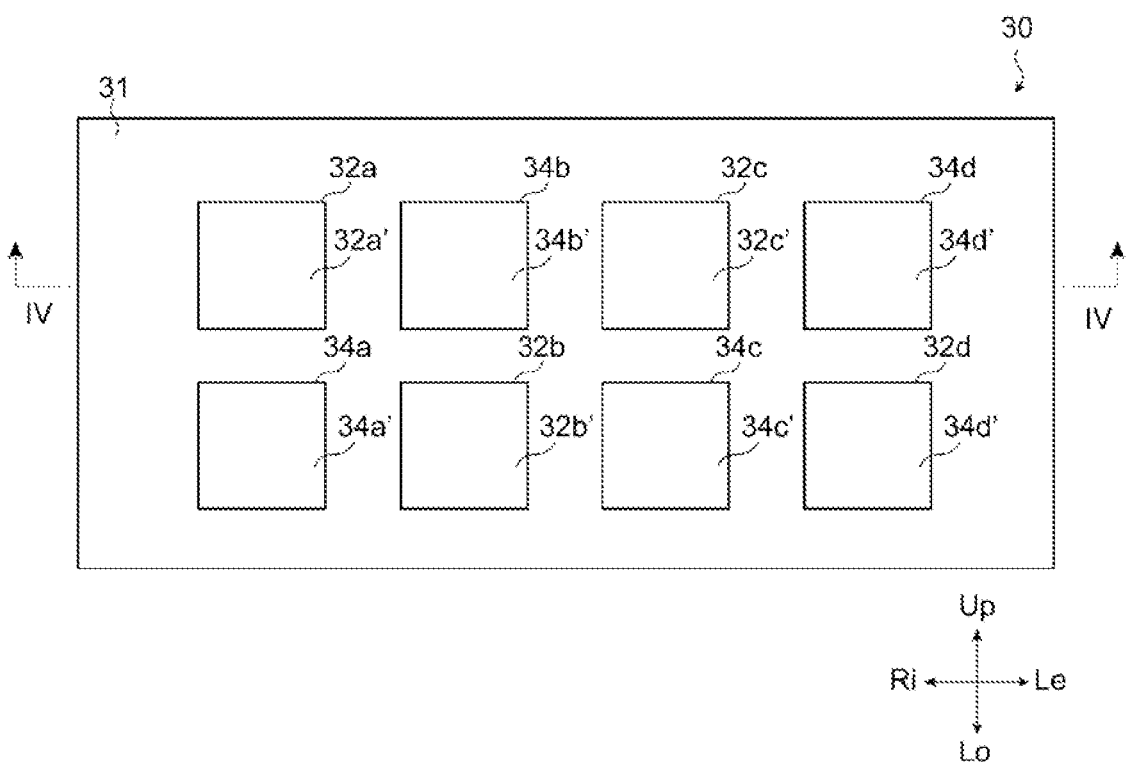
FIG. 3 is a front view of a light source module included in the head-up display device.
Figure 4:
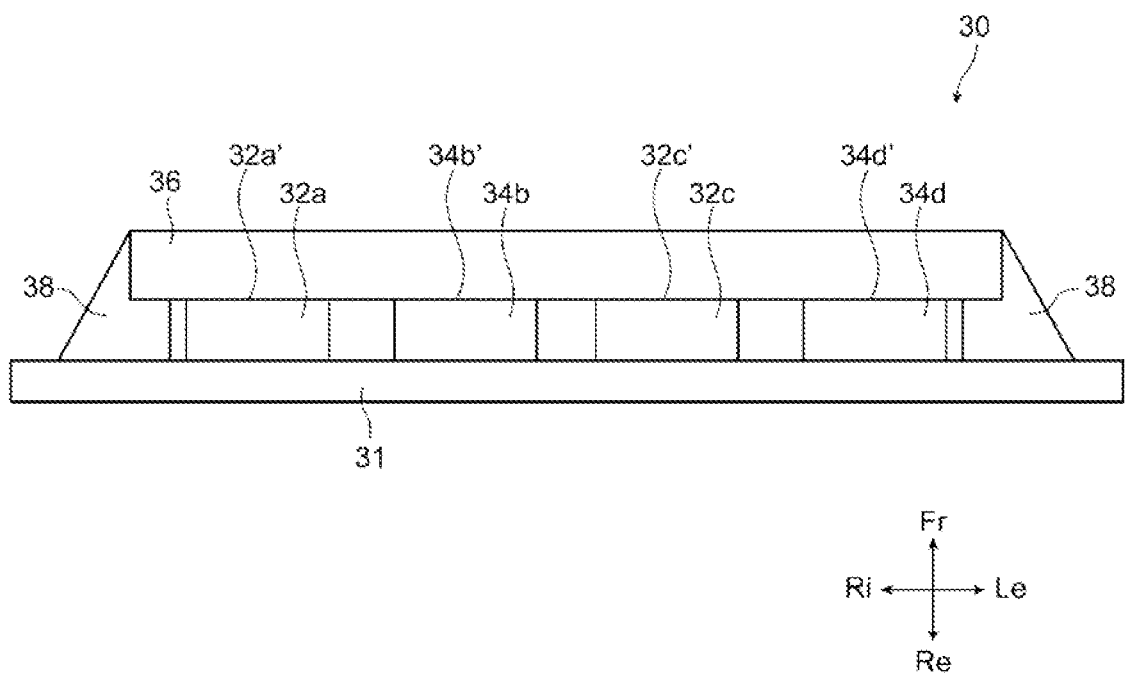
FIG. 4 is a cross-sectional view taken along line IV-IV of FIG. 3.

The light source module 30 will be described in detail. FIG. 3 is a view of the light source module 30 as viewed from the front of the vehicle C (that is, from the FR direction). FIG. 4 is a cross-sectional view taken along line IV-IV of FIG. 3.

The light source module 30 includes a board 31, four first LED elements (light emitting elements) 32a to 32d, four second LED elements 34a to 34d, a wavelength conversion member 36, and a reflection member 38. Hereinafter, the first LED elements 32a to 32d are simply referred to as the "first LED element 32" when the first LED elements 32a to 32d are collectively referred to or not particularly distinguished from each other. Similarly, the second LED elements 34a to 34d are simply referred to as the "second LED element 34" when the second LED elements 34a to 34d are collectively referred to or not particularly distinguished from each other.

The board 31 is formed in a flat plate shape by a material having high thermal conductivity. The four first LED elements 32a to 32d and the four second LED elements 34a to 34d are disposed on the board 31. That is, such elements are arranged on the same board 31.

The first LED element 32a, the second LED element 34b, the first LED element 32c, and the second LED element 34d are arranged in this order in the left-right direction on the board 31. The second LED element 34a, the first LED element 32b, the second LED element 34c, and the first LED element 32d are arranged in this order in the left-right direction on the board 31 so as to be parallel to the first LED element 32a, the second LED element 34b, the first LED element 32c, and the second LED element 34d. As a result, the first LED element 32 is adjacent to the second LED element 34 in the left-right direction and the up-down direction. The second LED element 34 is adjacent to the first LED element 32 in the left-right direction and the up-down direction.

The first LED element 32 is an LED element that emits blue light having a dominant wavelength in a wavelength range of 420 to 485 nm. The second LED element is an LED element that emits amber light having a dominant wavelength in a wavelength range of 577 nm to 587 nm.

The wavelength conversion member 36 is disposed on an optical path of the four first LED elements 32a to 32d and the four second LED elements 34a to 34d. In the present embodiment, the wavelength conversion member 36 is disposed to face light emitting surfaces 32a' to 32d' of the four first LED elements 32a to 32d and light emitting surfaces 34a' to 34d' of the four second LED elements 34a to 34d.

The wavelength conversion member 36 converts a part of the blue light emitted by the first LED element 32 into yellow light having a dominant wavelength in a wavelength range of 550 to 570 nm, and transmits at least a part of the blue light emitted by first LED element 32. The wavelength conversion member 36 substantially transmits the amber light emitted by the second LED element 34. For example, the wavelength conversion member 36 may transmit 50% or more of the amber light emitted by the second LED element 34.

Specifically, the wavelength conversion member 36 contains a fluorescent material. The fluorescent material absorbs a part of the blue light emitted by the first LED element 32 and emits yellow light in a Lambertian manner. At least a part of the blue light emitted by the first LED element 32 is emitted from the wavelength conversion member 36 without being absorbed by the fluorescent material. The amber light emitted by the second LED element 34 is substantially emitted from the wavelength conversion member 36 without being absorbed by the fluorescent material. For example, 70% or more of the amber light emitted by the second LED element 34 is not absorbed by the fluorescent material. The amber light emitted by the second LED element 34 is diffused particularly by the fluorescent material and is emitted from the wavelength conversion member 36.

The blue light transmitted through the wavelength conversion member 36 and the light converted into yellow by the wavelength conversion member 36 are mixed to generate white light. In the present embodiment, the amber light transmitted through the wavelength conversion member 36 is further mixed with the white light. Here, a correlated color temperature of the white light can be changed by changing luminance of the amber light to be mixed with the white light. The luminance is changed by adjusting an amount of driving current supplied to the LED element or changing the number of LED elements that emit light.

The reflection member 38 reflects the light from the LED element. As a result, the light that has reached the reflection member 38 without traveling toward the wavelength conversion member 36 is also reflected and used as irradiation light. Therefore, usage efficiency of the light source module 30 is improved.

The light emitted by each LED element is condensed by a condensing lens disposed in front of the wavelength conversion member 36 and emitted forward as the white light B1. The configuration of the light source module 30 shown in FIGS. 3 and 4 is an example, and other configurations may be used as long as the correlated color temperature of the emitted light can be adjusted.

Figure 5:
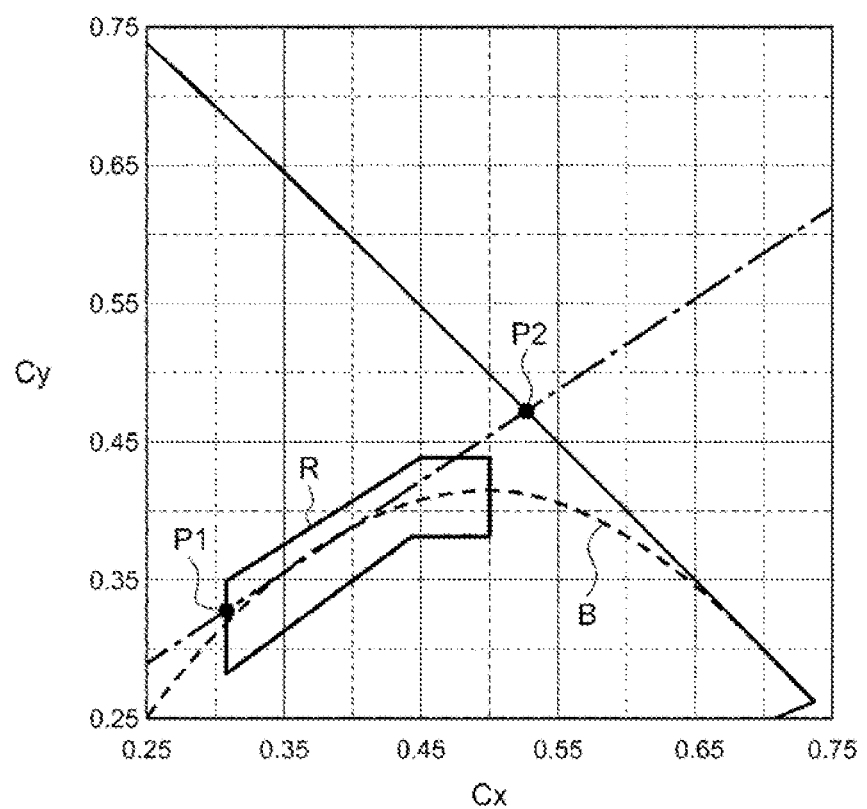
FIG. 5 shows an XY chromaticity diagram.

FIG. 5 shows an XY chromaticity diagram. In FIG. 5, a rectangular region R indicates a white standard range (approximately at a correlated color temperature of 3000K to 7000K) of the headlamp 10.

A graph B shows a black body locus. A chromaticity point P1 indicates a chromaticity point of the white light based on the first LED element 32 and the wavelength conversion member 36, and a chromaticity point P2 indicates a chromaticity point of the amber light from the second LED element 34. A correlated color temperature of the chromaticity point P1 is 6000K to 7200K, and a dominant wavelength of the chromaticity point P2 is 577 nm to 587 nm. By changing a ratio of color mixture of the white light and the amber light, the correlated color temperature can be adjusted as desired on a straight line connecting the chromaticity point P1 and the chromaticity point P2.

As is clear from FIG. 5, it is possible to adjust the correlated color temperature in the region R, particularly along the black spot locus.

(Block Diagram)

Figure 6:
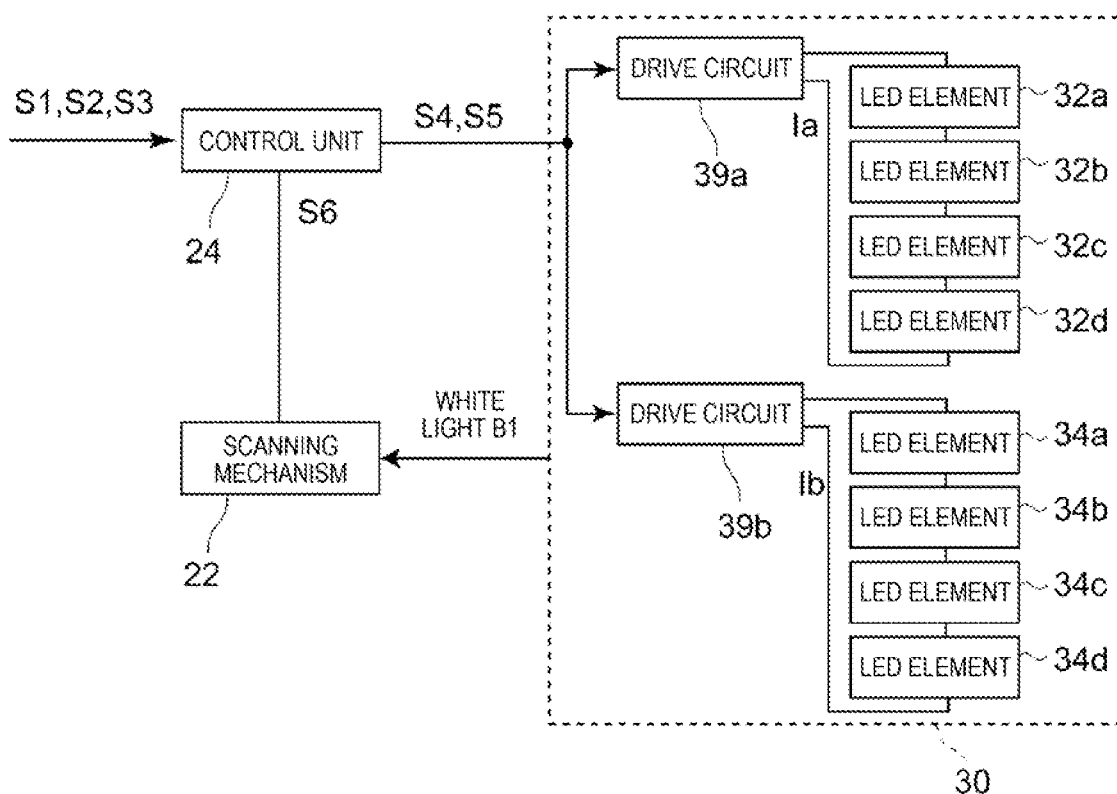
FIG. 6 is a block diagram of the head-up display device.

FIG. 6 is a block diagram of the head-up display device 20. Data S1 is data indicating the correlated color temperature of the irradiation light B2 of the headlamp 10. The data S1 is configured to be acquired by a method not shown in the drawings. For example, a correlated color temperature meter is provided on the headlamp 10. Alternatively, a value of a correlated color temperature of a light source used in the headlamp 10 may be input. Alternatively, for example, a correlated color temperature range of the headlamp 10 can be specified by a switch that switches among a yellow halogen (3000K~), a white bulb (4000K~5000K), and a blue HID (5000K~).

Data S2 is data indicating a traveling state transmitted from an in-vehicle device. Data S3 is data indicating a surrounding environment of the vehicle C. The data S2 includes a vehicle speed, a lamp switch signal, a continuous driving time, and the like. The data S3 includes navigation information, a rainfall situation, a road situation, and the like. The data S1, the data S2, and the data S3 are input to the control unit 24.

The light source module 30 includes a drive circuit 39a and a drive circuit 39b. The drive circuit 39a supplies a drive current Ia to the first LED element 32. The drive circuit 39b supplies a drive current Ib to the second LED element 34. The first LED element 32 emits light by the drive current Ia. The second LED element 34 emits light by the drive current Ib.

Based on the data S1 to S3, the control unit 24 determines a shape and a correlated color temperature of the image light and a position where the image light is projected, and generates a lighting control signal S4 and a dimming signal S5 of the light source module 30, and a control signal S6 of the scanning mechanism 22.

The drive circuit 39a supplies the drive current Ia to first LED element 32 corresponding to the dimming signal S5. The drive circuit 39b supplies the drive current Ib to the second LED element 34 corresponding to the dimming signal S5. Luminance of each LED element is determined by current values of the drive currents Ia and Ib. The drive circuit 39a supplies or stops the supply of the drive current Ia according to the lighting control signal S4. The drive circuit 39b supplies or stops the supply of the drive current Ib according to the lighting control signal S4.

The mixed light of the white light of the first LED element 32 emitted by the drive current Ia and the amber light of the second LED element 34 emitted by the drive current Ib in the same manner is emitted from the light source module 30 and incident on the scanning mechanism 22 as the white light B1 having the desired correlated color temperature.

The scanning mechanism 22 is controlled by the control signal S6. The white light B1 is scanned at a high speed by tilting of the reflector so as to form desired image light by a line image.

The control unit 24 adjusts the correlated color temperature of the white light B1 emitted by the light source module 30 in accordance with the correlated color temperature of the irradiation light B2 emitted by the headlamp 10. This is to make a difference in color tone of the light and thus increase visibility of the image light projected by the head-up display device 20.

Figure 7:
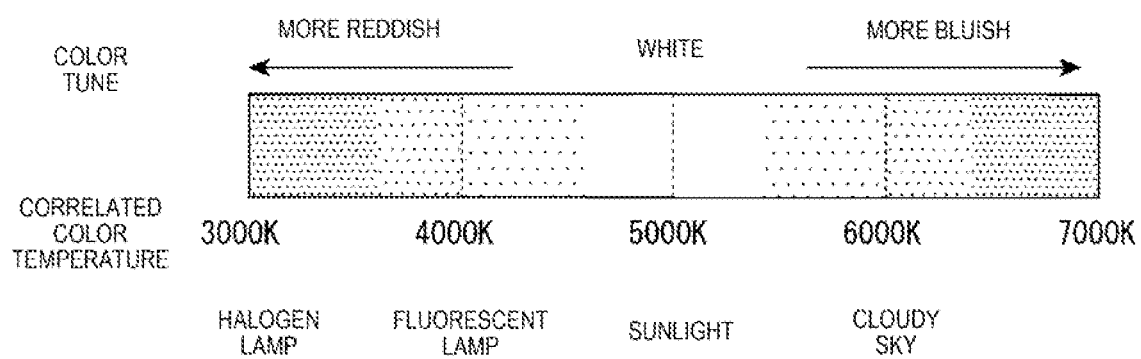
FIG. 7 is an explanatory diagram of a correlated color temperature.

FIG. 7 shows a correlated color temperature of light irradiated from an ideal black body (black body radiation). As shown in FIG. 7, a color becomes reddish when a correlated color temperature is low, and becomes bluish as the correlated color temperature increases. Since a correlated color temperature of the image light projected by the head-up display device 20 is formed by the white light B1, the correlated color temperature of the image light is the same as the correlated color temperature of the white light B1. A correlated color temperature of the light distribution pattern formed by the irradiation light B2 emitted from the headlamp 10 is the same as the correlated color temperature of the irradiation light B2.

Referring back to FIG. 1 again, an example shown on the right side of FIG. 1 will be described. As shown in FIG. 1, the arrow M, which is the image light, is visually recognized while being superimposed on a landscape irradiated by the high beam light distribution A. As described above, at least a part of regions of the irradiation light of the headlamp 10 and the image light of the head-up display device 20 may overlap with each other at the viewpoint (within an eye range) of the driver D. Both the high beam light distribution A and the arrow M are basically white. Therefore, the control unit 24 controls the light source module 30 so as to prevent the color of the arrow M that is information necessary for the driver D from becoming a protective coloration of the high beam light distribution A and becoming difficult to see.

Specifically, the correlated color temperature of the white light B1 of the light source module 30 is adjusted to be different from the correlated color temperature of the irradiation light B2 of the headlamp 10 by 1000 K or more. By making the difference of 1000 K or more between the correlated color temperatures, a clear difference is generated between the color tones of the white light B1 and the irradiation light B2, and thus visibility is prevented from being remarkably lowered due to color tone assimilation. As a result, the driver D can reliably recognize the arrow M.

The correlated color temperature of the white light B1 is preferably lower than the correlated color temperature of the irradiation light B2. With regard to ease of seeing (visibility) from human eyes, bluish light is recognized as stronger light. Therefore, by allocating the light having the high correlated color temperature to the headlamp 10, visibility of the front of the vehicle C can be ensured, and at the same time, visibility of the vehicle C seen from other vehicles can be improved. As a result, overall performance of the vehicle C and comfort of the driver D can be improved.

Reddish light having a low correlated color temperature has an effect of reducing eye fatigue. Therefore, when the color tones are differentiated, the correlated color temperature of the white light B1 forming the arrow M is lowered while the color of the irradiation light B2 of the headlamp 10 is kept unchanged. As a result, fatigue feeling of the driver D can be reduced, visibility of the arrow M can be ensured, and such two advantages can be utilized in a well-balanced manner.

The correlated color temperature of the white light B1 is preferably 4000 K or less. The white light B1 becomes reddish light, and thus feeling of eye fatigue of the driver D can be reduced.

Such correlated color temperature adjustment of the white light B1 may be performed only when the headlamp 10 is lighted. The control unit 24 may be configured to start the correlated color temperature adjustment when a lighting signal of the headlamp 10 is input as the data S2. As a result, the head-up display device 20 can be configured such that the correlated color temperature adjustment of the white light B1 is not performed when there is no concern that the image light and the light distribution pattern are visually recognized in an overlapping manner.

When the headlamp 10 is not used, for example, during daytime, a correlated color temperature of a landscape in front of the vehicle C may be acquired, and the acquired correlated color temperature of the landscape in front of the vehicle C may be input to the control unit 24 as the data S1. By adjusting the correlated color temperature of the white light B1 based on the correlated color temperature of the landscape in front of the vehicle C, ease of recognizing the image light of the head-up display device 20 can be kept high at any time.

Further, a color of an object irradiated by the irradiation light of the headlamp 10 or a correlated color temperature of the object may be detected by a sensor or the like, and the correlated color temperature of the white light B1 may be adjusted in accordance with the color of the object or the correlated color temperature of the object. By changing the correlated color temperature of the white light B1 to the same color side or an opposite color side of the object in consideration of the color of the object irradiated by the irradiation light B2, the object can be made conspicuous or, conversely, made inconspicuous. For example, when the color of the object to be irradiated is blue, visibility of the image light can be improved by a complementary color effect by lowering the correlated color temperature of the white light B1 to a yellowish color. According to such a configuration, ease of recognizing the image light can be further improved, the driver can be prevented from being dazzled and blinded, and thus drivability can be improved.

Second Embodiment

Figure 8:
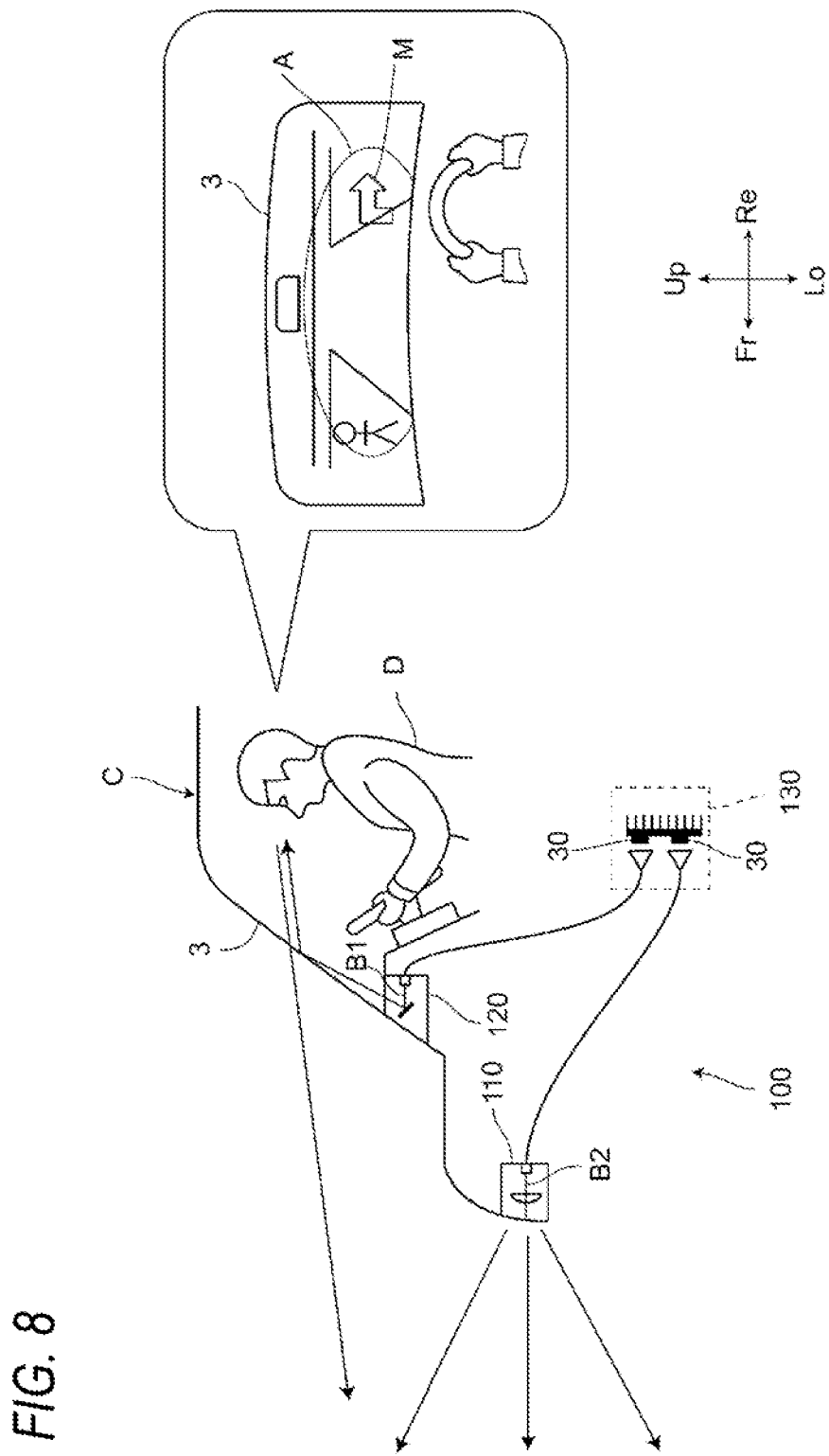
FIG. 8 is a schematic view showing a head-up display system according to a second embodiment.

FIG. 8 shows a head-up display system 100 according to a second embodiment. Elements having configurations equivalent to those of the first embodiment are denoted by the same reference numerals, and description thereof will be omitted.

The head-up display system 100 according to the second embodiment includes a head-up display device 120, a headlamp 110, and a light engine 130. The light engine 130 is used as a common light source for the head-up display device 120 and the headlamp 110.

The light engine 130 includes two light source modules 30. The two light source modules 30 are collectively controlled by the control unit 24 of the head-up display device 120. The two light source modules 30 are controlled independently of each other. The two light source modules 30 share the board 31, and all LED elements of the two light source modules 30 are arranged on the single board 31. Further, a heat sink is provided on a rear surface of the board 31.

The head-up display device 120 has the same configuration as that of the first embodiment except that the dedicated light source module 30 is not disposed in the housing 21. The white light B1 formed by one light source module 30 of the light engine 130 is supplied to the head-up display device 120 via a photoconductor that contains optical fibers.

Similarly, the headlamp 110 has the same configuration as that of the first embodiment except that no light source is disposed in the headlamp 110. The irradiation light B2 formed by the other light source module 30 of the light engine 130 is supplied to the headlamp 110 via a photoconductor.

In the present embodiment, the light engine 130 includes the two light source modules 30, and is configured to supply light from the light source modules 30 to the head-up display device 120 and the headlamp 110 via the photoconductors. However, the light engine 130 may be configured to further supply light to other vehicle lamps such as a fog lamp, a turn signal lamp, a room lamp, and a stop lamp. The light engine 130 is configured to have the same number of light source modules 30 as the number of vehicle lamps to be connected, and the supply of light to each vehicle lamp is independently controlled by the control unit 24. In this case, not only the light source module 30 but also a light source suitable for a lamp that supplies light, such as a halogen lamp bulb or a laser diode, may be used.

As described above, by accommodating the light source of the vehicle lamps at one place by using the light engine 130, temperature adjustment and cooling design performed for each vehicle lamp can be performed at one place, namely the light engine 130, and thus the number of design processes can be reduced. In addition, a temperature can be efficiently adjusted, and the number of components can be further reduced by commonizing the components.

Figure 9:
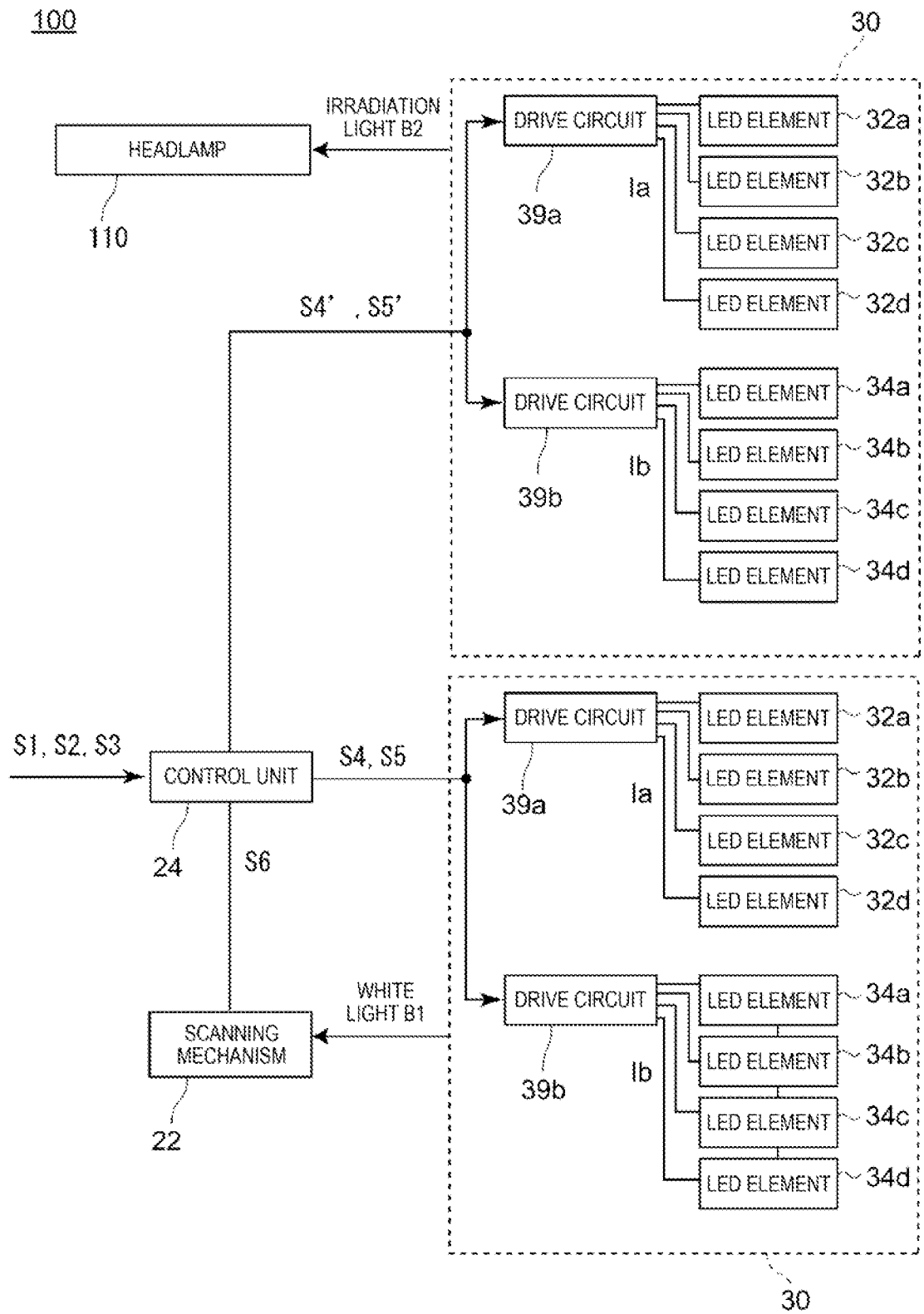
FIG. 9 is a block diagram of the head-up display system.

FIG. 9 is a block diagram of the head-up display system 100. Based on the data S1 to S3, the control unit 24 generates the lighting control signal S4 and the dimming signal S5 for controlling the one light source module 30, and a lighting control signal S4' and a dimming signal S5' for controlling the other light source module 30. The white light B1 is formed from the one light source module 30 and guided to the scanning mechanism 22. The irradiation light B2 is formed from the other light source module 30 and guided to the headlamp 110.

In the present embodiment, the LED elements are individually and independently supplied with a drive current from a drive circuit. With such a configuration, the drive current to be supplied can be set individually, and more detailed luminance adjustment can be performed with higher accuracy.

Here, referring back to FIG. 5 again, since the rectangular region R indicates the white standard range of the headlamp 110, the control unit 24 controls the light source module 30 in such a manner that the correlated color temperature of the irradiation light B2 supplied to the headlamp 110 falls within the region R.

Since not only the correlated color temperature of the white light B1 of the head-up display device 120 but also the correlated color temperature of the irradiation light B2 of the headlamp 110 are controlled by the control unit 24, both correlated color temperatures can be controlled in association with each other.

For example, in rainy weather, the correlated color temperature of the irradiation light B2 of the headlamp 110 may be set to about 3000 K, and, in response to this, the correlated color temperature of the white light B1 of the head-up display device 120 may be set to 4000 K or more. In the case of white light having a high correlated color temperature, light hits rain water droplets and is diffused, thus visibility thereof is reduced, while yellowish light having a low correlated color temperature is likely to be seen. Therefore, with such a configuration, the visibility of the image light can be ensured while visibility in the rainy weather is improved.

A correlated color temperature of a light distribution provided by the headlamp 110 may be adjusted based on the data S1 to S3, and the correlated color temperature of the head-up display device 120 may be changed in accordance with the adjustment. For example, based on the data S1 to S3, when driving on an expressway, that is, when speed data obtained by a speedometer exceeds a predetermined value, the correlated color temperature of the irradiation light B2 is adjusted to be increased in order to improve distant visibility. Alternatively, based on the data S1 to S3, when data of continuous driving time exceeds a predetermined value, the correlated color temperature of the irradiation light B2 is adjusted to be lowered in order to reduce feeling of fatigue during long-time driving. Then, the correlated color temperature of the head-up display device 120 is also changed in accordance with such adjustment.

With this configuration, the driver can visually recognize information easily, and the visibility of the front of the vehicle C is also ensured while the feeling of fatigue during driving is reduced.

Third Embodiment (Outline of Head-Up Display System)

Figure 10:
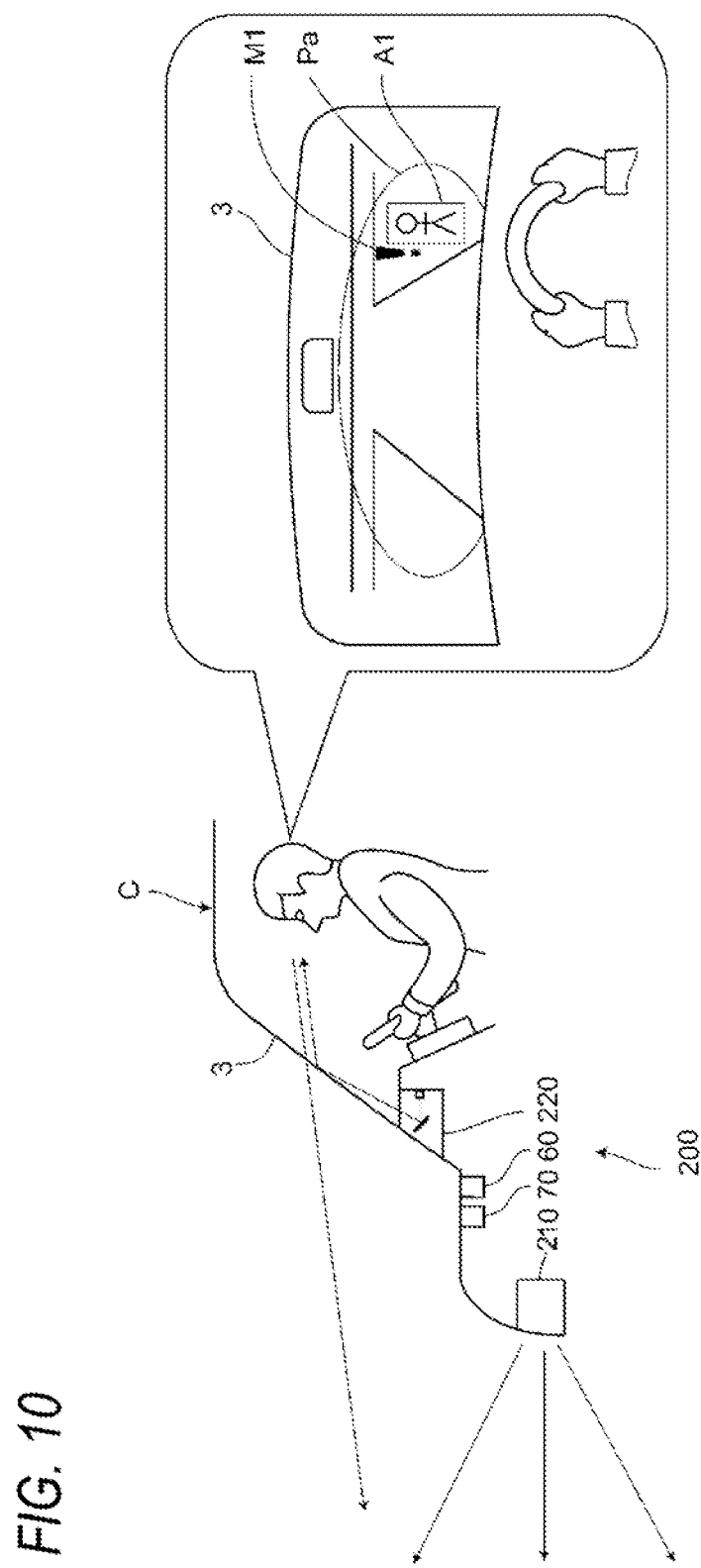
FIG. 10 is an explanatory diagram showing an outline of a head-up display system according to a third embodiment.

FIG. 10 is an explanatory diagram schematically showing a head-up display system 200 according to a third embodiment. The head-up display system 200 is mounted on the vehicle C. The head-up display system 200 includes a head-up display device 220, a variable light distribution device 210, an environment acquisition unit 60, and a color evaluation unit 70. The environment acquisition unit 60 is an example of an environment acquisition device.

The environment acquisition unit 60 acquires information such as a surrounding environment and a traveling state of the vehicle C by using various sensors, an image acquisition unit, and the like.

The variable light distribution device 210 is configured to form a light distribution pattern adapted to a driving situation and a surrounding situation of the vehicle C and to irradiate the light distribution pattern in front of the vehicle C. For example, as shown in FIG. 10, when a pedestrian is confirmed ahead from the information acquired by the environment acquisition unit 60, a dark portion A1 is formed in a high beam light distribution Pa to prevent the pedestrian from being dazzled.

The head-up display device 220 projects, as image light, images of various types of traveling information that are mainly effective for a driving operation of the driver in a predetermined display region provided in front of the driver seat, and displays the image light in such a manner that the image light is superimposed on a landscape seen from the driver seat through the windshield 3. In the present embodiment, the predetermined display region is a predetermined region of the windshield 3. Hereinafter, to display a virtual image superimposed on a landscape for the driver by projecting the image light by the head-up display device 220 is simply referred to as the display of the image light.

A position of a viewpoint of the driver is specified by a sensor, an image acquisition unit, or the like, and an image at the viewpoint of the driver is analyzed. When an object of attention is detected by the environment acquisition unit 60, image light for alerting is displayed at a position corresponding to the object of attention as viewed from the driver. For example, as shown in FIG. 10, an alerting mark M1 is displayed in accordance with a position of a pedestrian seen from the driver.

The head-up display system 200 associates the head-up display device 220 with the variable light distribution device 210 based on the information acquired by the environment acquisition unit 60, changes a form (shape and luminous intensity) of the light distribution pattern and a form (shape and color) of the image light, and captures information important for the driver in a way that attracts attention of the driver.

(Variable Light Distribution Device)

Figure 11:
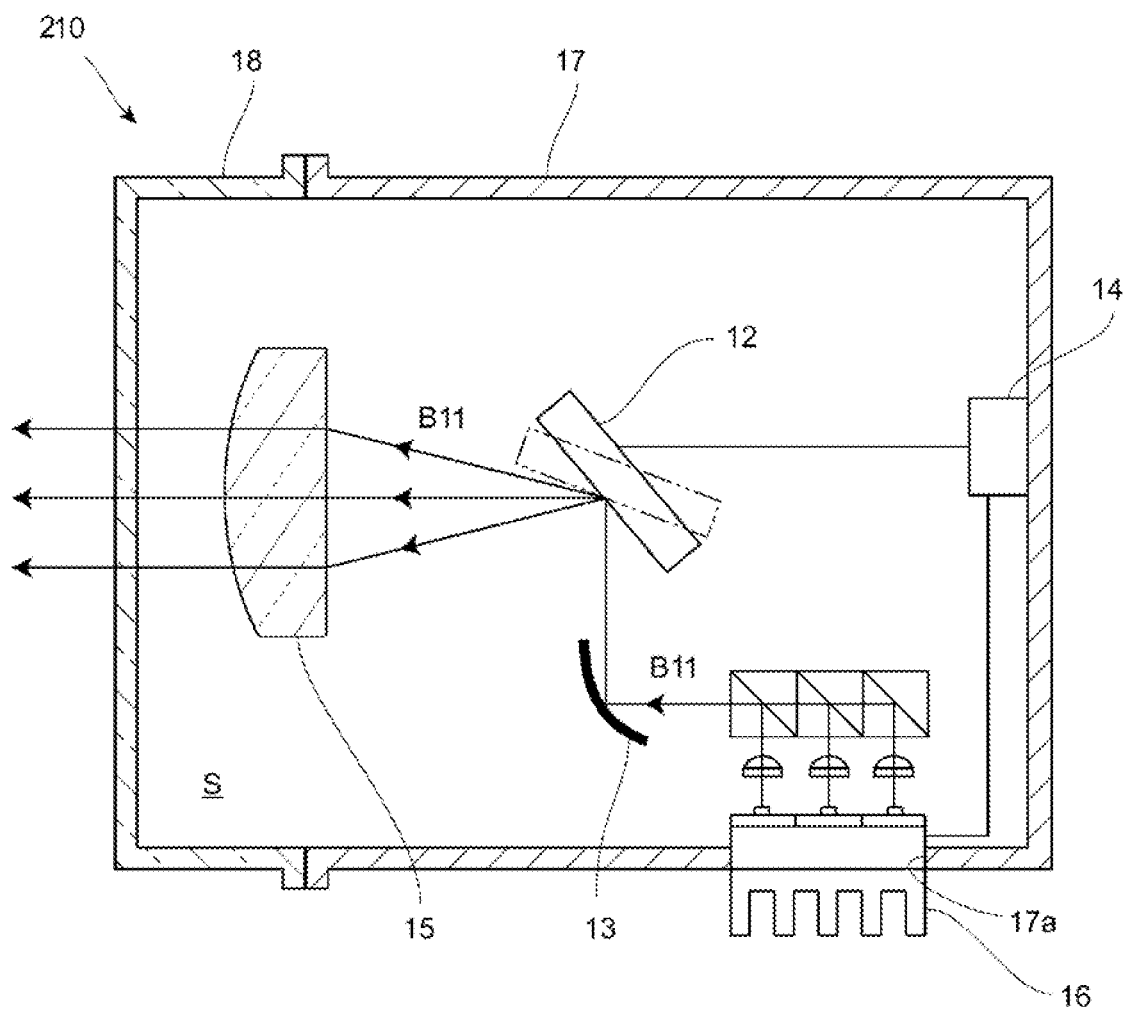
FIG. 11 is a cross-sectional view showing a configuration of a variable light distribution device.

First, the variable light distribution device 210 provided in the head-up display system 200 will be described. FIG. 11 is a cross-sectional view showing a configuration of the variable light distribution device 210.

The variable light distribution device 210 is a headlamp, and is configured to have an adapting driving beam (ADB) function that enables a light distribution pattern to be variable according to a state of surroundings and the traveling state of the vehicle C. The variable light distribution device 210 forms a desired light distribution pattern and irradiates the front of the vehicle C.

As shown in FIG. 11, the variable light distribution device 210 includes a first scanning mechanism 12, a reflector 13, a light distribution control unit 14, a first projection lens 15, and a first light source unit 16 in a housing S. The housing S includes a lamp body 17 that includes an opening, and a front cover 18 attached to the opening of the lamp body 17. The front cover 18 is made of translucent resin, glass, or the like.

The reflector 13 includes a reflecting surface configured to reflect light. The reflector 13 reflects light B11 emitted from the first light source unit 16 toward the first scanning mechanism 12. It should be noted that, when the light B11 emitted from the first light source unit 16 can be directly guided to the first scanning mechanism 12, it is not necessary to provide the reflector 13.

The first scanning mechanism 12 is a scanning device including a reflector capable of tilting about two axes. The first scanning mechanism 12 is disposed at a position where the incident light B11 can be reflected by the reflector toward the first projection lens 15. The first scanning mechanism 12 scans an incident surface of the first projection lens 15 with the light B11 at high speed by reciprocating movement of the reflector. As a result, desired image light is formed by stacking of light.

The first projection lens 15 is a plano-convex aspheric lens whose incident surface facing the first scanning mechanism 12 is a flat surface and whose emission surface on an opposite side is a convex surface. The first projection lens 15 emits the light incident from the first scanning mechanism 12 forward.

The light distribution control unit 14 controls the first light source unit 16 and the first scanning mechanism 12 and integrally controls the variable light distribution device 210. The light B11 emitted from the first light source unit 16 under the control of the light distribution control unit 14 is reflected by the reflector 13 and incident on the first scanning mechanism 12. A desired image light formed as a line image by the light B11 on the incident surface of the first projection lens 15 based on the reciprocating movement of the reflector of the first scanning mechanism 12 is projected on a virtual vertical screen in front of the vehicle C via the first projection lens 15. In the present embodiment, the image light formed by the variable light distribution device 210 is a desired light distribution pattern, and is emitted from the first projection lens 15 and irradiated to the front of the vehicle C.

Figure 12:
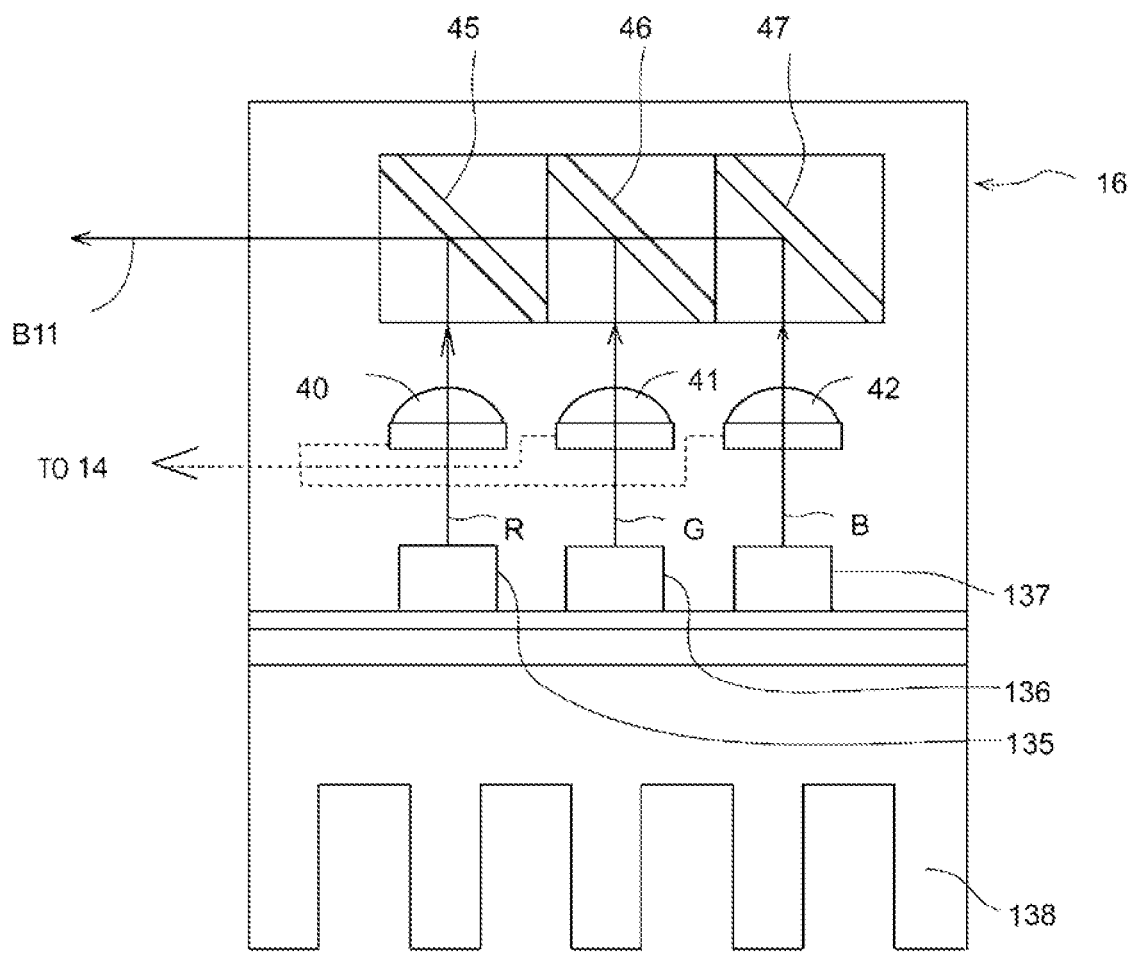
FIG. 12 is an explanatory diagram showing a configuration of a light source unit.

FIG. 12 is a side view of the first light source unit 16. In FIG. 12, interior of a housing of the first light source unit 16 is shown in a see-through manner. The first light source unit 16 is an RGB laser unit. A first light source 135 that emits red laser light, a second light source 136 that emits green laser light, and a third light source 137 that emits blue laser light are fixed to a support base 138 via a board. The light emitted from the first light source 135 is condensed as parallel light by a condensing lens 40 and is incident on a dichroic mirror 45. The light emitted from the second light source 136 is condensed as parallel light by a condensing lens 41 and is incident on a dichroic mirror 46. The light emitted from the third light source 137 is condensed as parallel light by a condensing lens 42 and is incident on a dichroic mirror 47. The light incident on the dichroic mirrors 45, 46, and 47 passes through the dichroic mirrors 45, 46, and 47 is subjected to RGB combination. The light B11 emitted from the dichroic mirrors 45, 46, and 47 can be formed as each monochromatic light, mixed color light, or white light. Output of each of the first light source 135, the second light source 136, and the third light source 137 is controlled by the light distribution control unit 14 so that irradiation intensity of the light B11 is controlled. The first light source unit 16 includes three light sources of RGB, including the first light source 135, the second light source 136, and the third light source 137. However, the first light source unit 16 may include a single white light source. Alternatively, the first light source unit 16 may include four light sources in which an orange laser diode is added to RGB. Alternatively, the first light source unit 16 may include a configuration in which light emitted from a blue laser diode passes through a yellow fluorescent material so as to generate white by excitation. In addition, each of the first light source 135, the second light source 136, and the third light source 137 may be a laser other than the laser diode.

In the first light source unit 16 of the present embodiment, the support base 138 also serves as a heat sink. In order to avoid a temperature rise in the housing S, a heat sink portion of the support base 138 is attached to the lamp body 17 so as to be disposed outside a hole portion 17a of the lamp body 17.

The configuration of the first light source unit 16 shown in FIG. 12 is an example, and other configurations may be used as long as emitted light can be formed with a desired color.

Figure 13:
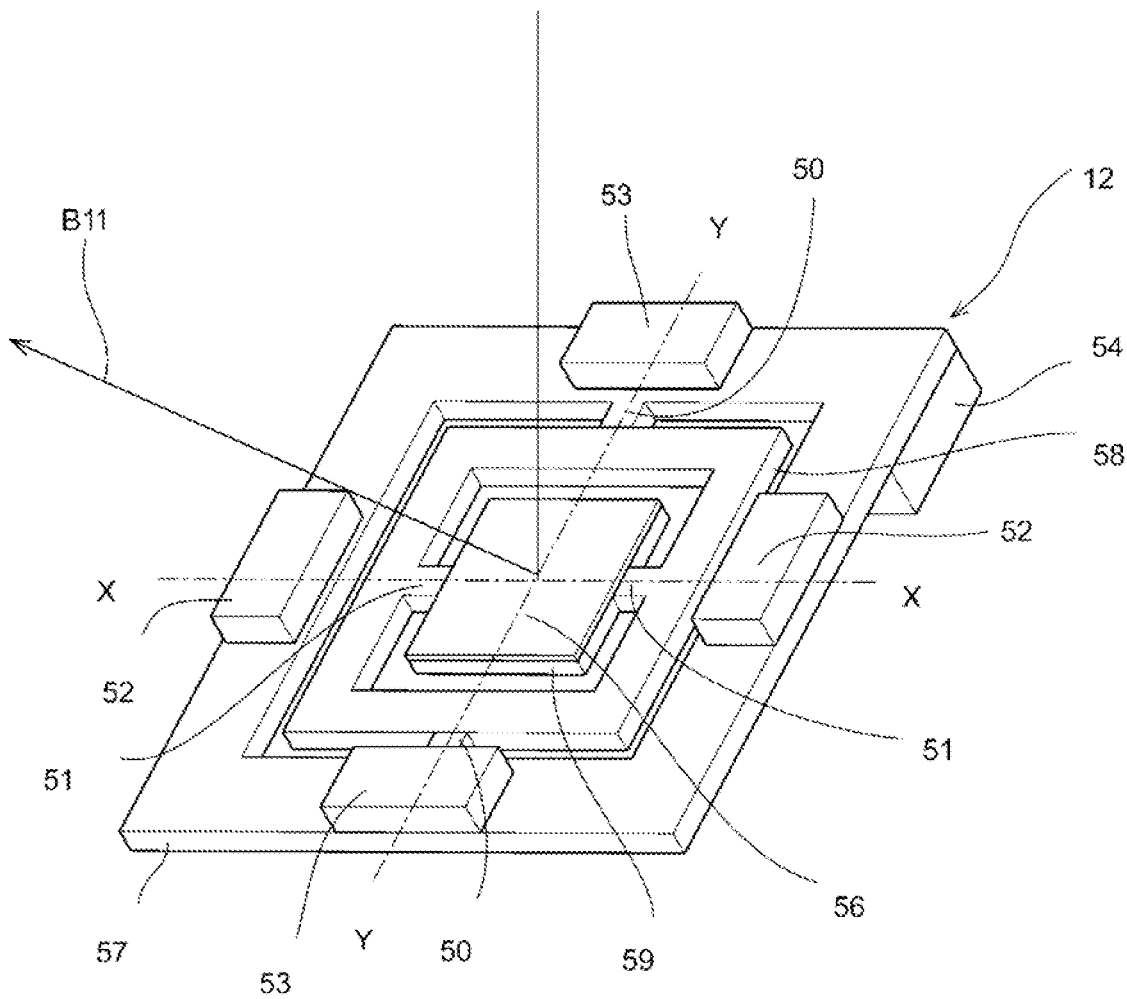
FIG. 13 is a perspective view showing a scanning mechanism.

FIG. 13 is a perspective view of the first scanning mechanism 12. The first scanning mechanism 12 is a scanning device including the reflector capable of tilting in two axial directions. In the present embodiment, a micro electro mechanical systems (MEMS) mirror is employed as an example.

The first scanning mechanism 12 includes a base 57, a first rotating member 58, a second rotating member 59, a first torsion bar 50, a second torsion bar 51, a pair of first permanent magnets 52, a pair of second permanent magnets 53, and a terminal portion 54. The second rotating member 59 is a reflector formed in a plate shape. A reflecting surface 56 is formed on a front surface of the second rotating member 59 by vapor deposition of silver, sputtering, or the like.

The plate-shaped first rotating member 58 is supported by the first torsion bar 50 so as to be rotatable leftward and rightward (around a Y axis). The second rotating member 59 is supported by the first rotating member 58 in a state of being rotatable upward and downward (around an X axis) by the pair of second torsion bars 51. The pair of first permanent magnets 52 and the pair of second permanent magnets 53 are respectively provided on the base 57 in a direction in which the pair of first and second torsion bars (50, 51) extend. The pair of first and second rotating members (58, 59) are provided with first and second coils (not shown) to be energized through the terminal portions 54, respectively. The first and second coils (not shown) are subjected to independent energization control performed by the light distribution control unit 14.

The first rotating member 58 reciprocates and tilts around an axis (Y line) of the first torsion bar based on ON or OFF of energization of the first coil (not shown). The second rotating member 59 reciprocates and tilts around an axis (X axis) of the second torsion bar 51 based on ON or OFF of energization of the second coil (not shown). The reflecting surface 56 is tilted upward, downward, leftward, and rightward based on the energization of the first or second coil (not shown) so as to reflect the light B11.

The first scanning mechanism 12 scans a region related to a desired light distribution pattern with the light B11. The scanned light is projected forward of the vehicle C via the first projection lens 15.

The light distribution control unit 14 may control emission of the laser light from the first light source 135, the second light source 136, and the third light source 137 in accordance with the scanning with the light B11 performed by the first scanning mechanism 12. For example, the first scanning mechanism 12 rotates the reflecting surface 56 in a range wider than the region related to the light distribution pattern. Then, the light distribution control unit 14 lights each of the first light source 135, the second light source 136, and the third light source 137 when a position where the reflecting surface 56 is rotated is a position corresponding to the region related to the light distribution pattern to be formed. According to such control, a predetermined light distribution pattern can be formed in front of the vehicle C.

As described above, the light distribution control unit 14 controls the output of each light source of the first light source unit 16 and the energization of each coil of the first scanning mechanism 12, so that the variable light distribution device 210 forms the desired image light (light distribution pattern).

Figure 14:
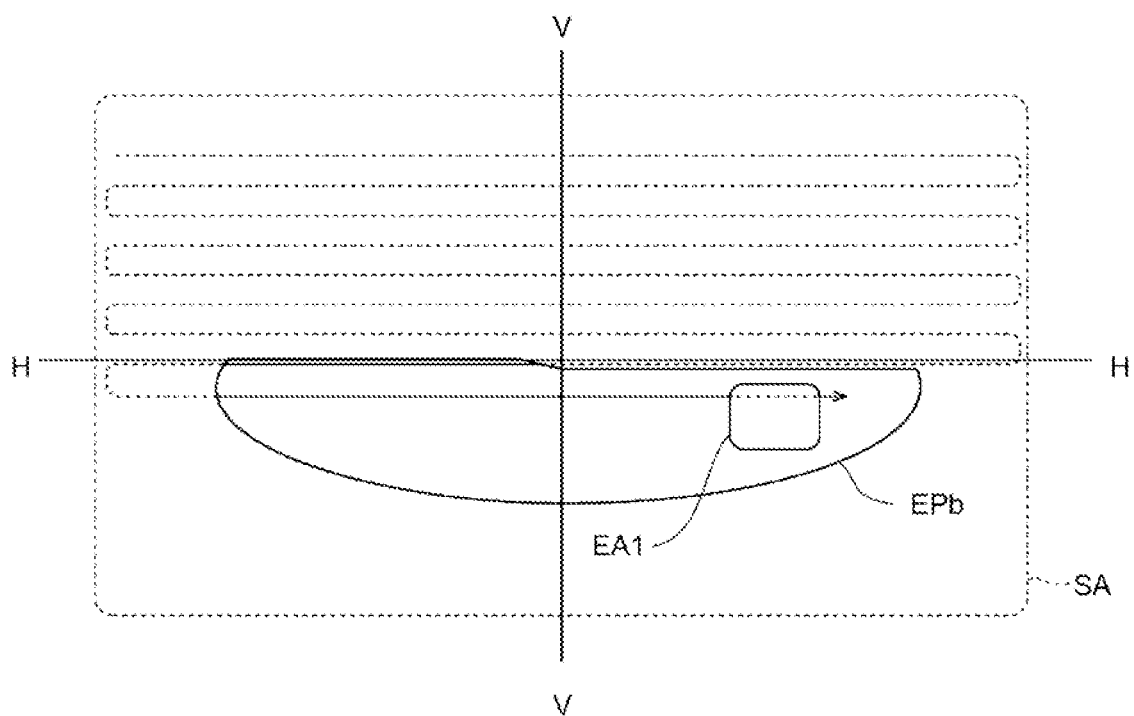
FIG. 14 shows an example of a lighting region of a light distribution pattern formed by the scanning mechanism.

FIG. 14 shows a lighting region EPb related to a low beam light distribution, which is an example of the image light formed by the first scanning mechanism 12. The lighting region EPb is projected through the first projection lens 15 while being vertically and horizontally inverted, and is formed as a low beam light distribution. The first scanning mechanism 12 according to the present embodiment can scan the light B11 within a rectangular scanning range SA.

When a scanning position of the first scanning mechanism 12 is within the lighting region EPb, the light distribution control unit 14 causes the first light source 135, the second light source 136, and the third light source 137 to emit laser light, and when the scanning position of the first scanning mechanism 12 is outside the lighting region EPb, the light distribution control unit 14 stops the emission of the laser light from each light source. By repeating one cycle (one scan) within the scanning range SA at a high speed in this manner, an image is formed as desired by stacking line images of the light B11.

Here, as shown in FIG. 14, in a case where a region-as-desired EA1 is present in the lighting area EPb, when the scanning position of the first scanning mechanism 12 is in the region EA1, the light distribution control unit 14 performs control to stop the emission of the laser light from each light source or decrease the output thereof. In a light distribution pattern thus formed, a dark portion that is a low luminous intensity region having lower luminous intensity than other regions can be formed. Alternatively, conversely, when the region EA1 is scanned with light, by increasing the output of the laser light from each light source, a bright portion that is a high luminous intensity region having higher luminous intensity than other regions can be formed in the low beam light distribution.

The first scanning mechanism 12 scans the incident surface of the first projection lens 15 with the light B11 by reciprocating movement of the reflecting surface 56. A focus point of the first projection lens 15 is set on a surface of the reflecting surface 56. The lighting region EPb (including the region EA1) in which the line images are vertically stacked is vertically and horizontally inverted via the first projection lens 15 and projected in front of the vehicle C.

In this way, the light distribution control unit 14 adjusts the output of the light source of the first light source unit 16 in accordance with timing of the scanning of the light B11, so that not only a light distribution pattern having a predetermined shape such as a high beam light distribution or a low beam light distribution can be formed, but also a light distribution pattern having a bright portion whose luminous intensity is higher than other regions or a dark portion whose luminous intensity is lower than other regions can be formed in the region as desired.

(Head-Up Display Device)

Figure 15:
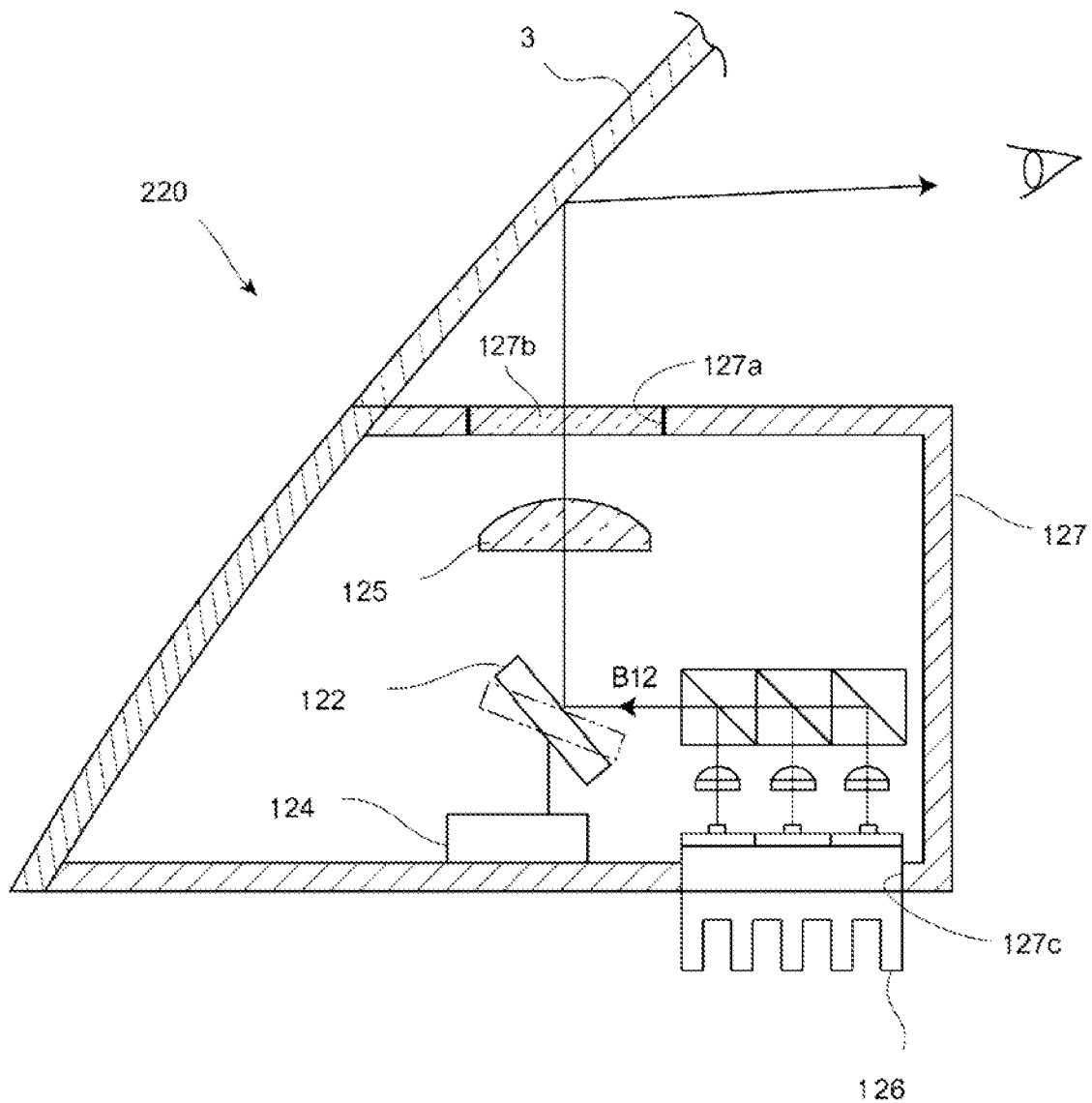
FIG. 15 is a cross-sectional view showing a configuration of a head-up display device.

Next, the head-up display device 220 will be described. FIG. 15 is a cross-sectional view showing a configuration of the head-up display device 220. The head-up display device 220 includes a second scanning mechanism 122, a projection control unit 124, a second projection lens 125, and a second light source unit 126 in a housing 127.

The second scanning mechanism 122 has a configuration equivalent to that of the first scanning mechanism 12, the projection control unit 124 has a configuration equivalent to that of the light distribution control unit 14, the second projection lens 125 has a configuration equivalent to that of the first projection lens 15, and the second light source unit 126 has a configuration equivalent to that of the first light source unit 16. Therefore, detailed description of the second scanning mechanism 122, the projection control unit 124, the second projection lens 125, and the second light source unit 126 will be omitted.

The second projection lens 125 is provided to project image light onto a predetermined region on the windshield 3 in a specific size. An opening 127a is provided in an upper wall of the housing 127, and allows light from the second projection lens 125 to pass therethrough. A transparent cover 127b that transmits light may be provided to cover the opening 127a.

A reflector of the second scanning mechanism 122 is disposed to be capable of facing the second projection lens 125. Light B12 emitted from the second light source unit 126 is formed into image light by the second scanning mechanism 122, and is projected onto the windshield 3 via the second projection lens 125. Similarly to the head-up display device 220, under control of the projection control unit 124, the second scanning mechanism 122 can form image light as desired by stacking line images of light. By forming desired information as image light by the second scanning mechanism 122 and projecting the image light onto the windshield 3, the driver can visually recognize the information as a virtual image. Similarly to the first light source unit 16, the second light source unit 126 can form mixed light of any color as desired. The projection control unit 124 switches a color of B12 formed by a light source of the second light source unit 126 in accordance with timing of scanning of the light B12, so that at least a part of the image light can be displayed with color.

In the present embodiment, the variable light distribution device 210 and the head-up display device 220 include the first scanning mechanism 12 and the second scanning mechanism 122. However, instead of the first scanning mechanism 12 and the second scanning mechanism 122, other mechanisms known in related art or other configurations may be used as long as image light or a light distribution pattern can be formed as desired by light. The other mechanisms known in the related art include, for example, a light source unit having a swivel function, a pixel optical device such as an LED array or a liquid crystal shutter in which a plurality of light sources are arranged in a matrix, a light deflection device such as a digital mirror device (DMD), a rotation mechanism using a rotation reflector or a polygon mirror, and the like.

(Block Diagram)

Figure 16:
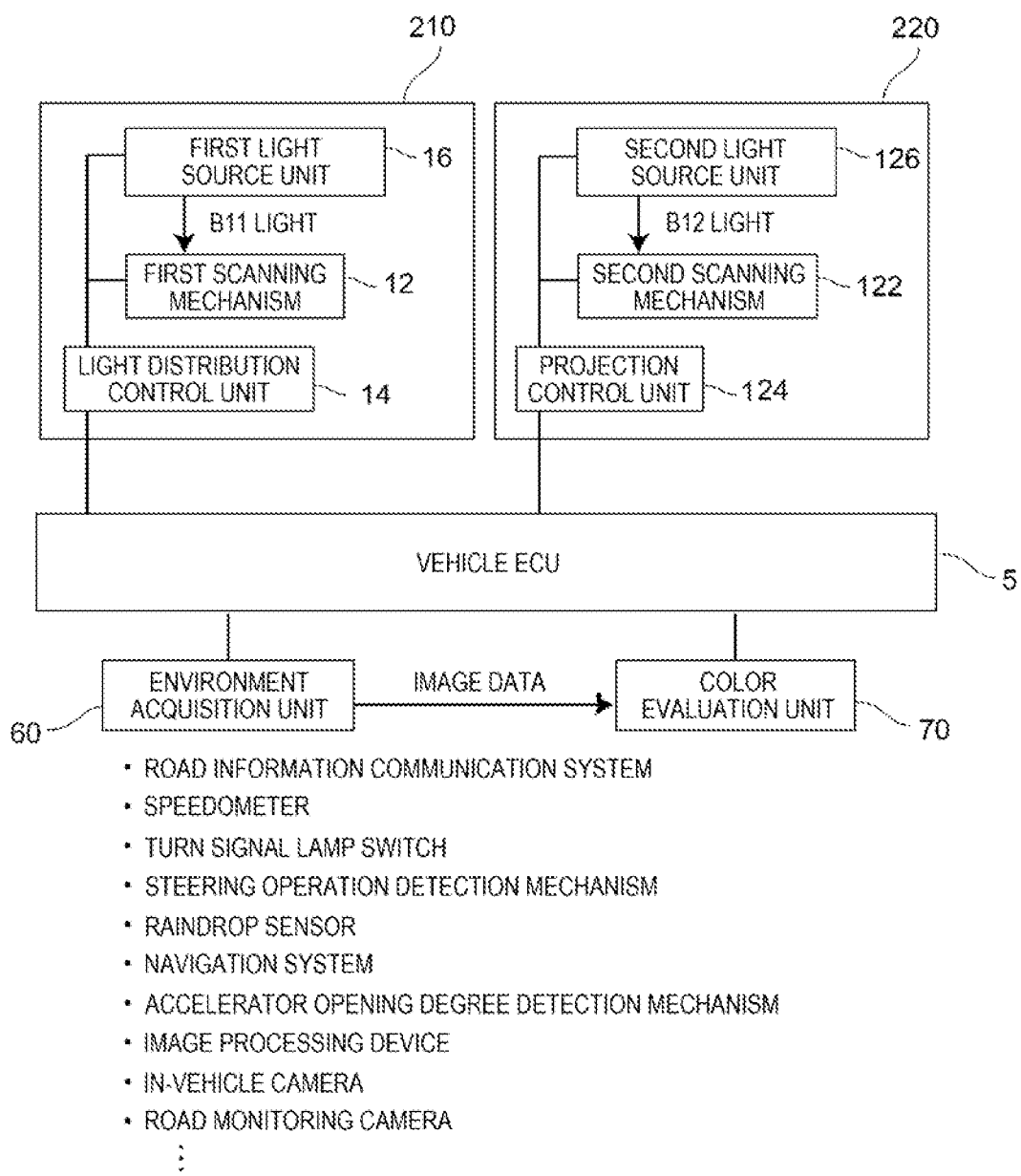
FIG. 16 is a block diagram of the head-up display system according to the third embodiment.

Next, a control configuration of the head-up display system 200 will be described with reference to FIG. 16.

A vehicle ECU 5 includes elements and circuits such as a CPU and a memory of a computer as a hardware configuration, and is implemented by a computer program or the like as a software configuration. The CPU executes a control program stored in the memory to generate various control signals. The vehicle ECU 5 integrally controls various devices mounted on the vehicle C.

The head-up display device 220 and the variable light distribution device 210 are connected to the vehicle ECU 5. In the present embodiment, the head-up display device 220 is controlled by the projection control unit 124, and the variable light distribution device 210 is controlled by the light distribution control unit 14. The vehicle ECU 5 controls the head-up display device 220 and the variable light distribution device 210 via the projection control unit 124 and the light distribution control unit 14. The head-up display device 220 and the variable light distribution device 210 may also be connected to the environment acquisition unit 60 and the color evaluation unit 70 without the vehicle ECU 5.

The environment acquisition unit 60 that acquires information on the vehicle C is connected to the vehicle ECU 5. Specifically, the environment acquisition unit 60 includes a unit that acquires information on the vehicle C and a unit that acquires information on surroundings of the vehicle C. The unit that acquires the information on the vehicle C includes, for example, a speedometer, a turn signal lamp switch, a steering operation detection mechanism, an accelerator opening degree detection mechanism, a navigation system, and the like. The unit that acquires the information on the surroundings of the vehicle C includes, for example, an image processing device that processes an image acquired by an image acquisition unit such as a road monitoring camera or an in-vehicle camera, a road information communication system, and the like.

The information on the vehicle C includes a traveling direction, a vehicle speed, a vehicle position, an accelerator depression amount, and the like, and such data signals are sent to the vehicle ECU 5.

The road information communication system receives information on the surroundings of the vehicle C, such as a rainfall amount of a road on which the vehicle is traveling, a traffic condition of the road, and map data of the surroundings, via a communication line such as the Internet, and sends the information to the vehicle ECU 5.

Examples of the road monitoring camera include an intersection camera disposed at an intersection, and a monitoring camera that is installed in the vicinity of a road and captures a road surface condition, a pedestrian, a vehicle such as a bicycle, a motorcycle, or an automobile, an obstacle, or the like as a moving image or a still image. Examples of the in-vehicle camera include a camera that is mounted on the own vehicle or another vehicle and captures a moving image or a still image of the surroundings of the vehicle. The image processing device is connected to a road monitoring camera via a communication line such as the Internet, and acquires video and image data from the road monitoring camera. The image processing device sends data obtained by analyzing an image or the like captured by the in-vehicle camera, the road monitoring camera, or the like to the vehicle ECU 5. In the present embodiment, the acquired image data includes not only a monochrome image but also a color image, and the analyzed image data is also sent to the color evaluation unit 70 described later.

The vehicle ECU 5 detects an object of attention such as an oncoming vehicle, a preceding vehicle, a pedestrian, or a retroreflecting object (a sign or a signboard) based on the data signal received from the environment acquisition unit 60. The vehicle ECU 5 further grasps and analyzes a position and state of the object of attention, the traveling state of the own vehicle, and a state around the own vehicle, and determines an appropriate light distribution mode (form of light distribution pattern) based on these states. The traveling state of the own vehicle and the state around the own vehicle include, for example, a road shape, weather, and the like. The vehicle ECU 5 sends a control signal to the light distribution control unit 14 such that the variable light distribution device 210 forms a light distribution pattern. As a result, optimal light distribution can be performed based on the information on the vehicle C acquired by the environment acquisition unit 60. It should be noted that although the detection and analysis of the object of attention and the light distribution control for determining the light distribution mode are performed by the vehicle ECU 5, such processes may also be performed by the light distribution control unit 14. The vehicle ECU 5 or the light distribution control unit 14 is an example of a light distribution control unit.

At the same time, the vehicle ECU 5 determines a form and a projection position of the image light that displays the information useful for the driver based on the data signal received from the environment acquisition unit 60. The vehicle ECU 5 transmits a control signal to the projection control unit 124 such that the head-up display device 220 displays the image light. It should be noted that although the image light control for determining the form and the projection position of the image light is performed by the vehicle ECU 5, the control may also be performed by the projection control unit 124. The vehicle ECU 5 or the projection control unit 124 is an example of an image light control unit.

Further, the vehicle ECU 5 changes the form of the light distribution pattern for an object of attention to be warned of the driver, and sends a control signal to the light distribution control unit 14. In addition, the vehicle ECU 5 sends a control signal to the projection control unit 124 such that the head-up display device 220 performs an alerting display. Specifically, the vehicle ECU 5 analyzes a position of the object of attention, and changes the form of the light distribution pattern so as to form, in a region in a predetermined light distribution pattern corresponding to the position of the object of attention, a bright portion that is a high luminous intensity region having a luminous intensity higher than that of other regions or a dark portion that is a low luminous intensity region having a luminous intensity lower than that of other regions. The vehicle ECU 5 also determines the form and projection position of the image light in such a manner that the image light for alerting is displayed at a corresponding position on the windshield 3 in accordance with a field of view of the driver sitting on the driver seat.

The color evaluation unit 70 is also connected to the vehicle ECU 5. The color evaluation unit 70 specifies a representative color based on a color distribution of a specific region from the image data received from the environment acquisition unit 60. Specifically, the representative color of a surrounding region including the object of attention at the viewpoint of the driver is specified for the object of attention to be alerted, which is specified by the vehicle ECU 5. Based on the representative color specified by the color evaluation unit 70, the alerting display is performed in an appropriate form for the driver.

EXAMPLE 1

The head-up display system 200 is adapted to the bright portion or the dark portion in the light distribution pattern formed by the variable light distribution device 210, and changes the form of the image light by the head-up display device 220. A specific example will be described with reference to FIG. 17.

Figure 17:
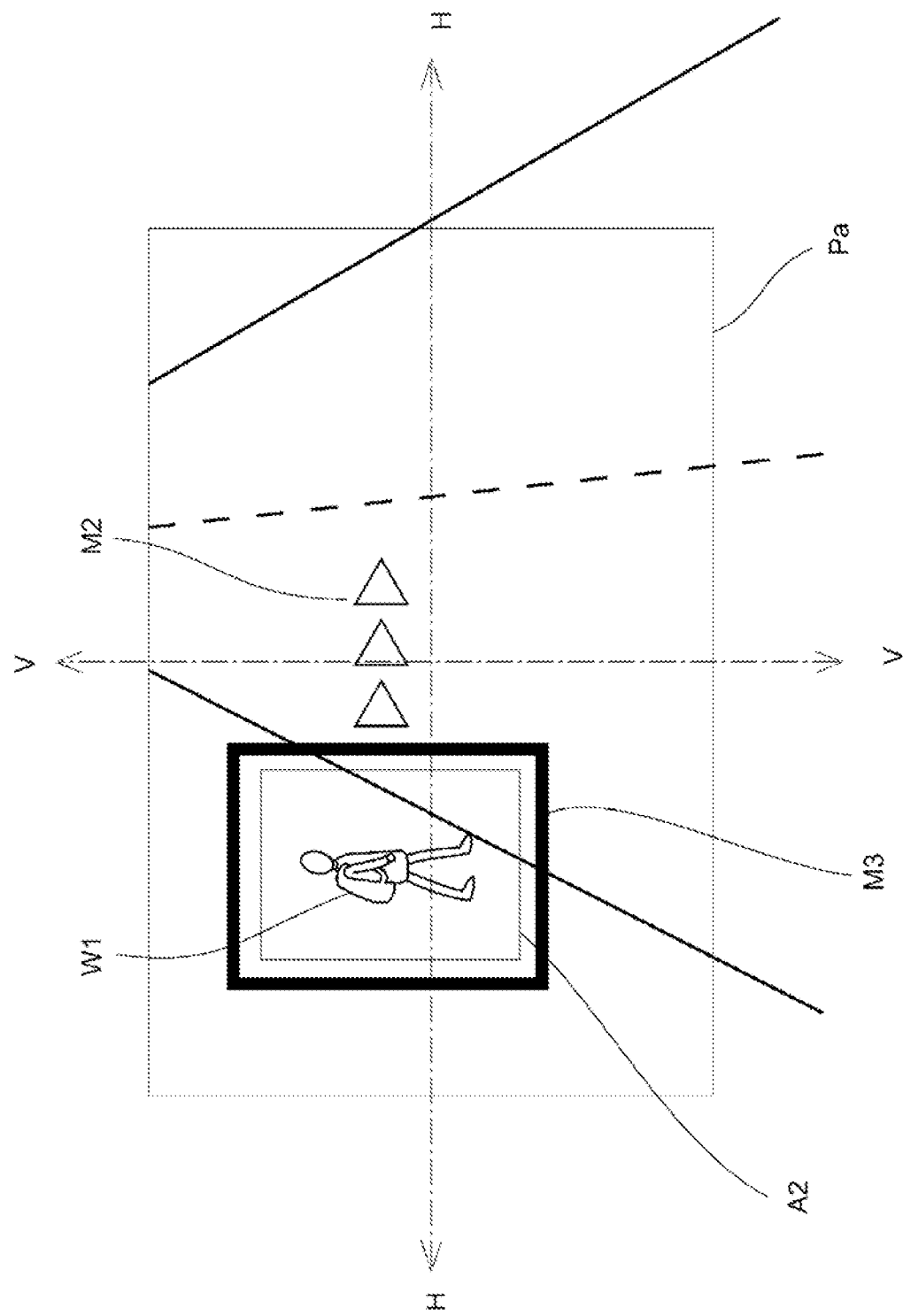
FIG. 17 shows a first example.

FIG. 17 shows a first example, and is based on the field of view of the driver when the driver sits in the driver seat and views the front of the vehicle C. FIG. 17 shows a landscape visually recognized by the driver sitting in the driver seat of the vehicle C through the windshield 3, and includes the irradiation light (light distribution pattern) formed by the variable light distribution device 210 and the image light (actually, a virtual image) that is formed by the head-up display device 220 and is visually recognized in a superimposed manner on the landscape.

Figure 18:
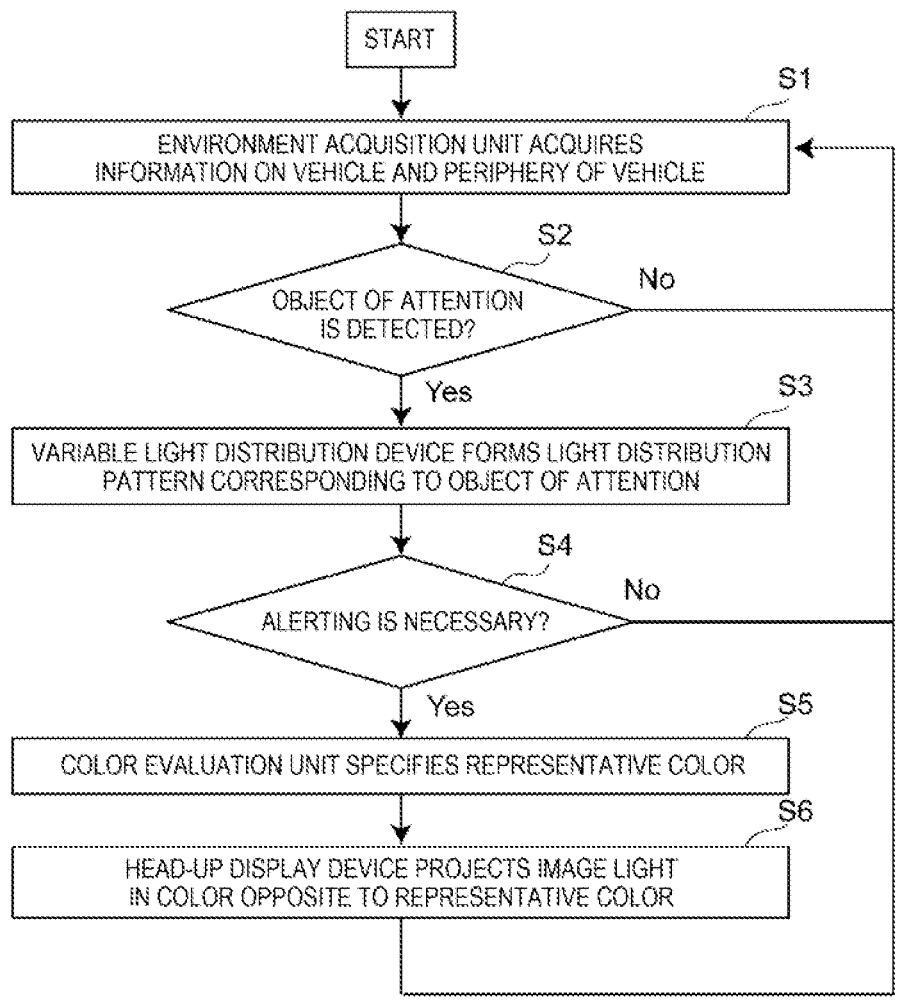
FIG. 18 is a flowchart of a head-up display system.

FIG. 18 is a flowchart of the head-up display system 200. In the head-up display system 200, when an object of attention around the vehicle is detected from the information acquired by the environment acquisition unit 60, a light distribution pattern and image light corresponding to the object of attention are formed based on a position and a state of the object of attention. This process will be described with reference to FIG. 18 using FIG. 17 as an example.

As shown in FIG. 18, in the head-up display system 200, the environment acquisition unit 60 acquires information on the vehicle and information on a periphery of the vehicle (step S1).

As shown in FIG. 17, when a pedestrian W1 who is going to cross a road on a path of the vehicle is detected from the information acquired by the environment acquisition unit 60 (step S2), the variable light distribution device 210 forms a dark portion A2 in the high beam light distribution Pa in order to prevent dazzling of the pedestrian W1 (step S3). Even when the object of attention such as the pedestrian W1 is not detected, the environment acquisition unit 60 always collects the information on the surroundings.

When it is determined that there is a risk of collision based on a position, a traveling direction, or a walking speed of the pedestrian W1 (step S4), as shown in FIG. 17, the head-up display device 220 displays a rectangular mark M3, a mark M2 indicating an expected traveling direction, and the like as image light to alert the driver in order to notify presence of the pedestrian W1.

The environment acquisition unit 60 provides the color evaluation unit 70 with image data of the surroundings including the pedestrian W1, and the color evaluation unit 70 specifies a representative color based on a color distribution of the received image data (step S5).

Based on the representative color specified by the color evaluation unit 70, the head-up display device 220 displays the mark M3, which is the image light for alerting the pedestrian W1, in an opposite color of the representative color specified by the color evaluation unit 70 (step S6).

Figure 19:
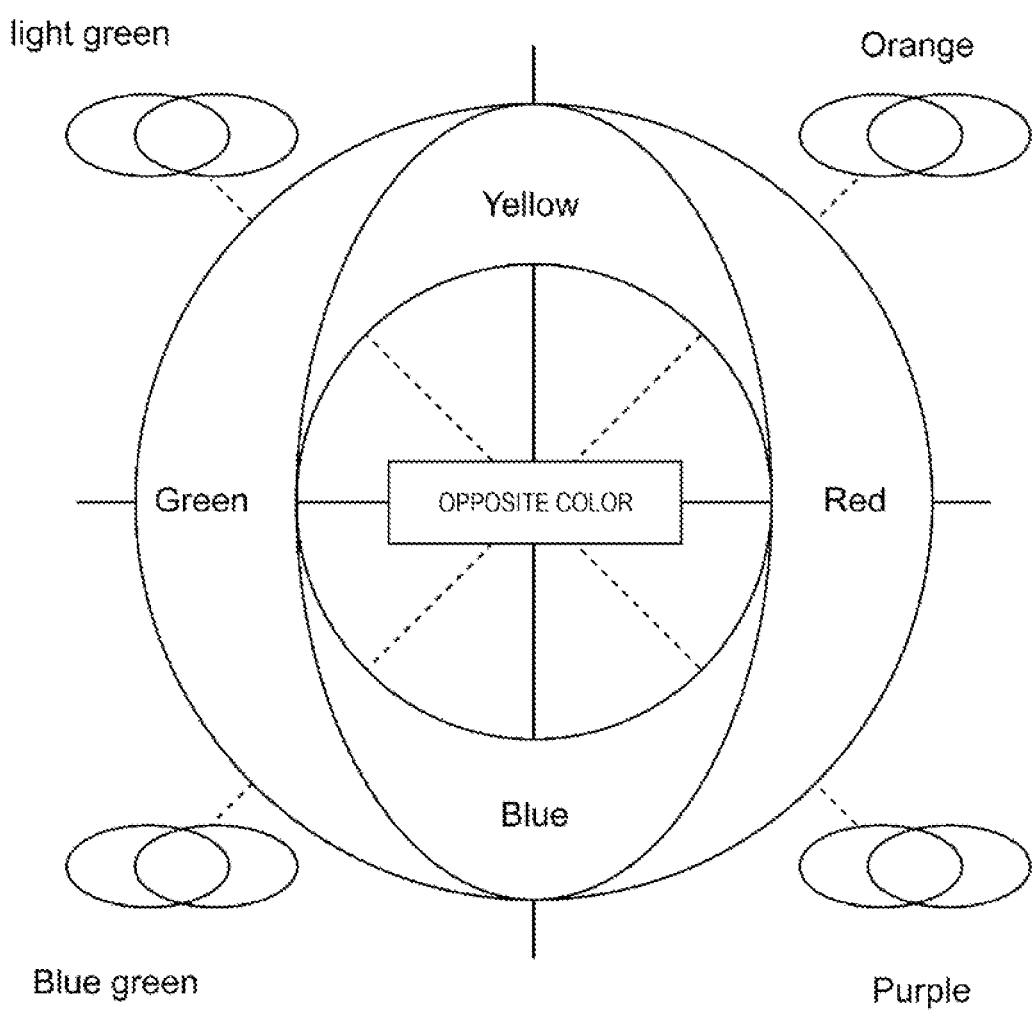
FIG. 19 shows a hue circle.

Here, the term "opposite color" refers to a hue located opposite in a hue circle. FIG. 19 shows the hue circle, and shows an arrangement of representative eight colors (yellow, red, blue, green, and mixed colors thereof) as an example. Hues located exactly opposite to each other in the hue circle correspond to opposite colors (in other words, complementary colors). Color combinations of opposite colors have an effect of complementing colors of each other.

For example, when the pedestrian W1 wears a blue one-piece, carries a blue backpack, or wears a blue blazer, the color evaluation unit 70 specifies that blue is a representative color of the pedestrian W1. The head-up display device 220 displays the mark M3 in yellow, which is a color opposite to the blue color specified as the representative color of the pedestrian W1. As a result, the mark M3 can be emphasized relative to the pedestrian W1.

The environment acquisition unit 60 always acquires information. The dark portion A2 moves in the light distribution pattern in accordance with movement of the pedestrian W1, and at the same time, the mark M2 and the mark M3 also move in accordance with the movement of the pedestrian W1. Further, a form of the light distribution pattern and a form of the image light are changed according to the situation. For example, in a case where there is a change in the representative color specified by the color evaluation unit 70 (in a case where there is a change in the color distribution since the pedestrian W1 holds an umbrella, puts on a coat, or the like), the color of the mark M3 is also changed accordingly.

Since the light emitted from the headlamp is determined to be white, the light projected from the variable light distribution device 210 is always white light. Here, if the mark M3 is displayed in white, the color of the mark M3 may become a protective coloration of the high beam light distribution Pa, and visibility of the mark M3 may be deteriorated. Alternatively, when the mark M3 is displayed in blue, since the representative color of the pedestrian W1 is blue, the color of the mark M3 becomes a protective coloration of the pedestrian W1 and it is difficult for the driver to visually recognize the necessary information. By configuring the head-up display system 200 as described above, the pedestrian W1 can be prevented from dazzling, the driver can strongly recognize the presence of the pedestrian W1 due to the light distribution pattern and the image light, and the necessary information can be provided in an easy-to-grasp form to the driver.

EXAMPLE 2

Figure 20:
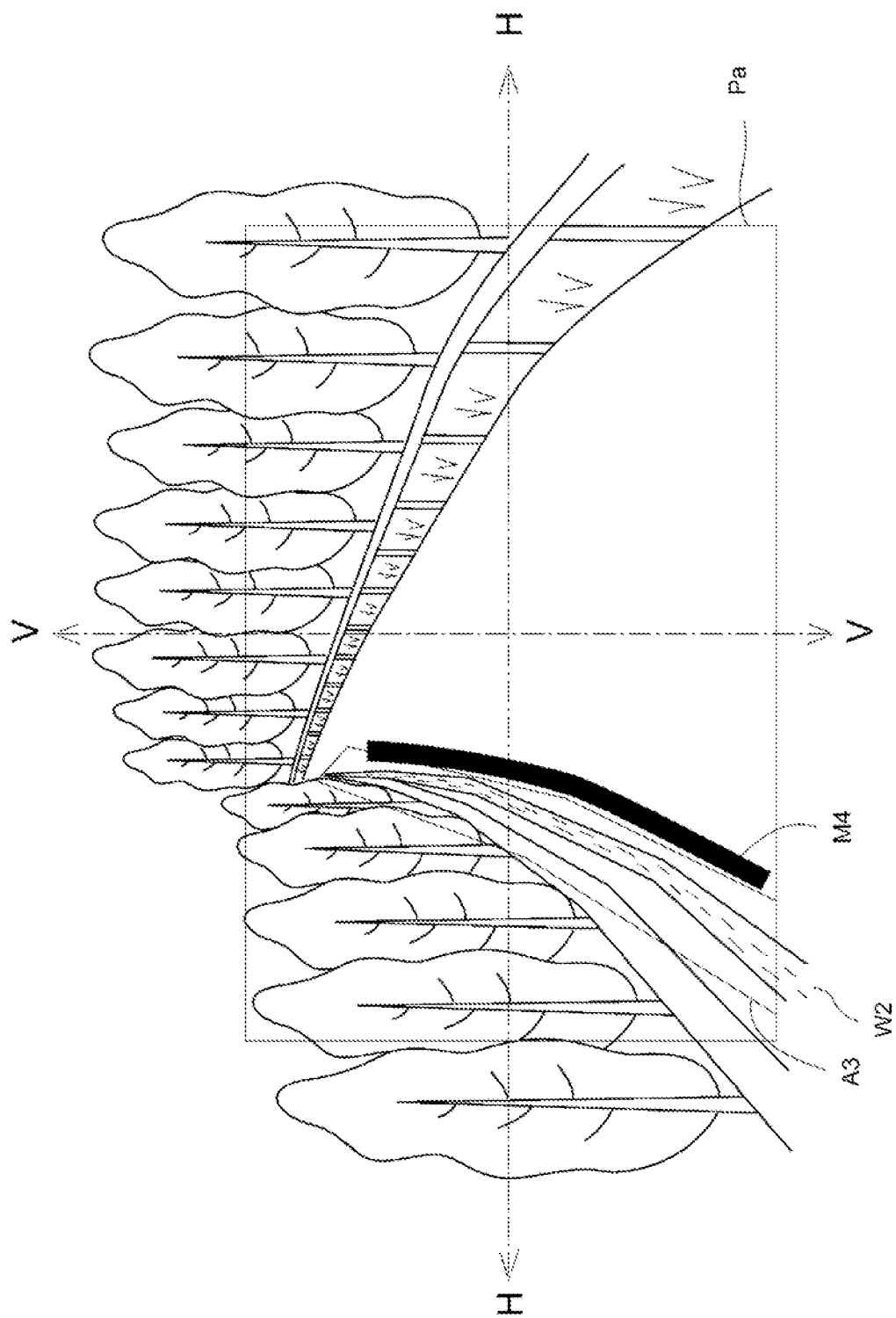
FIG. 20 shows a second example.

FIG. 20 shows a second example. FIG. 20 is based on the field of view of the driver as in FIG. 17, and shows a preferred form of the light distribution pattern and a preferred form of the image light in a case where the vehicle C travels on a mountain road having trees on both sides and a side ditch on the left side.

As shown in FIG. 20, when presence of a side ditch W2 is recognized from the information acquired by the environment acquisition unit 60, a bright portion A3, which is a region having higher luminous intensity than other regions, is formed in the high beam light distribution Pa in order to improve visibility and allow the driver to recognize a position of the side ditch W2. Since the bright portion A3 is formed along the side ditch W2, the driver can easily grasp the position of the side ditch W2. Therefore, the driver can drive more safely.

In a side ditch on a narrow mountain road, there is a risk that a tire falls in the side ditch and cannot travel. Therefore, in order to further alert the driver, the head-up display device 220 displays the mark M4 as image light of a line along the side ditch W2.

When the color evaluation unit 70 specifies that a representative color around the side ditch W2 is green due to plants existing along the side ditch W2, the head-up display device 220 displays the mark M4 along the side ditch W2 in red, which is an opposite color of green.

Visibility of the mark M4 is improved by the complementary color effect, and thus the driver can be further alerted.

Fourth Embodiment

Figure 21:
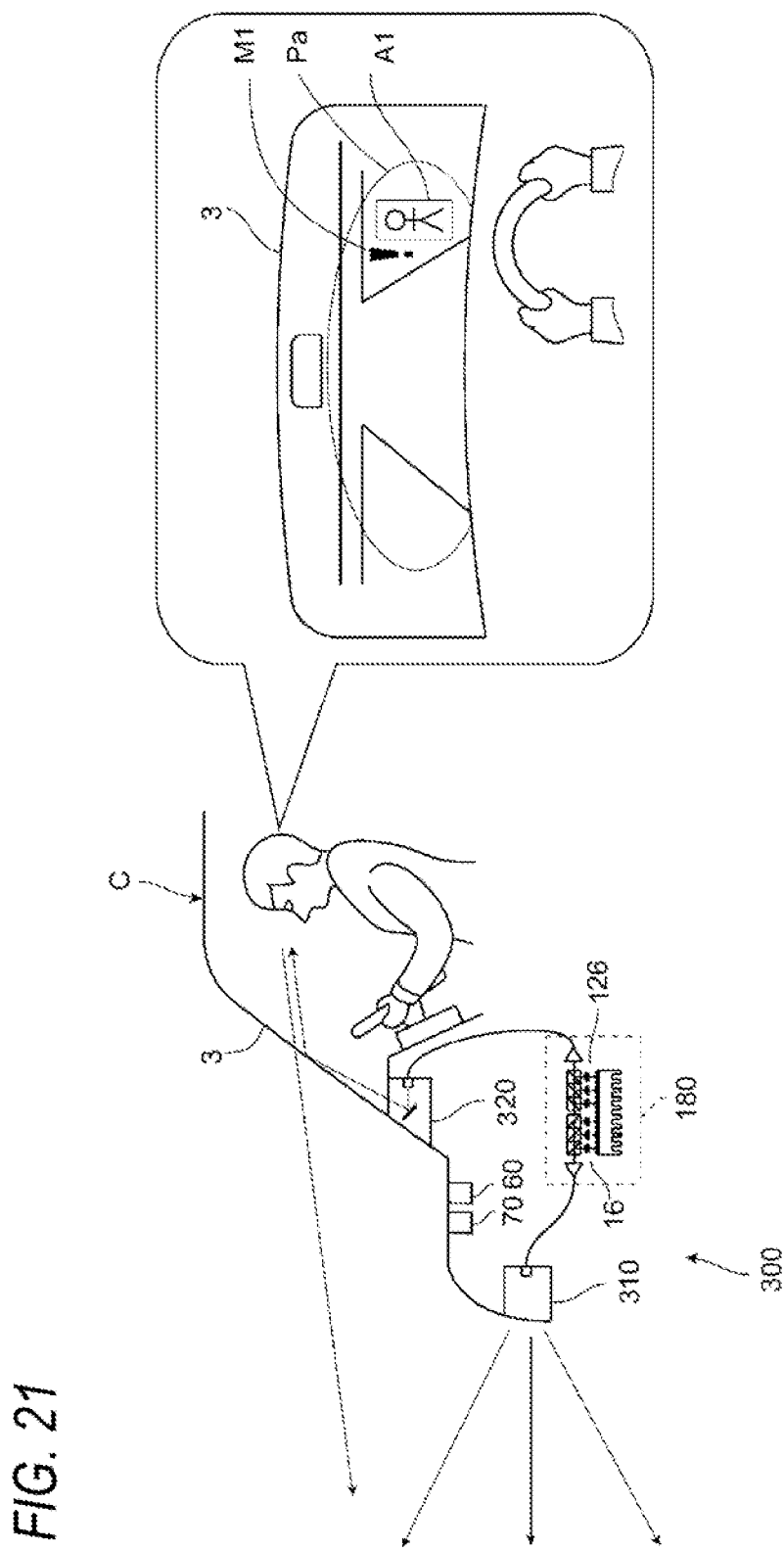
FIG. 21 is an explanatory diagram showing an outline of a head-up display system according to a fourth embodiment.

FIG. 21 is an explanatory diagram showing an outline of a head-up display system 300 according to a fourth embodiment. Components having the same configurations as those of the third embodiment are denoted by the same reference numerals, and description thereof will be omitted.

The head-up display system 300 according to the fourth embodiment includes a head-up display device 320, a variable light distribution device 310, a light engine 180, the environment acquisition unit 60, and the color evaluation unit 70. The light engine 180 is used as a common light source for the head-up display device 320 and the variable light distribution device 310.

The light engine 180 has configurations and functions of the first light source unit 16 and the second light source unit 126. The first light source unit 16 and the second light source unit 126 are examples of a light source. The light B11 formed by the first light source unit 16 is supplied to the variable light distribution device 310 via a photoconductor that contains optical fibers. Similarly, the light B12 formed by the second light source unit 126 is supplied to the head-up display device 320 via a photoconductor that contains optical fibers.

In the light engine 180, the first light source unit 16 and the second light source unit 126 share a board, and light emitting elements of the first light source unit 16 and light emitting elements of the second light source unit 126 are all disposed on the only one board. Further, a heat sink is provided as a support base on a back surface of the board.

As described above, the light source of the head-up display device 320 and the light source of the variable light distribution device 310 are accommodated at one place by using the light engine 180. As a result, temperature adjustment and cooling design performed for each of the light source of the head-up display device 320 and the light source of the variable light distribution device 310 can be performed at one place, namely the light engine 180. Therefore, the number of design processes can be reduced. In addition, a temperature can be efficiently adjusted, and the number of components can be further reduced by commonizing the components.

Figure 22:
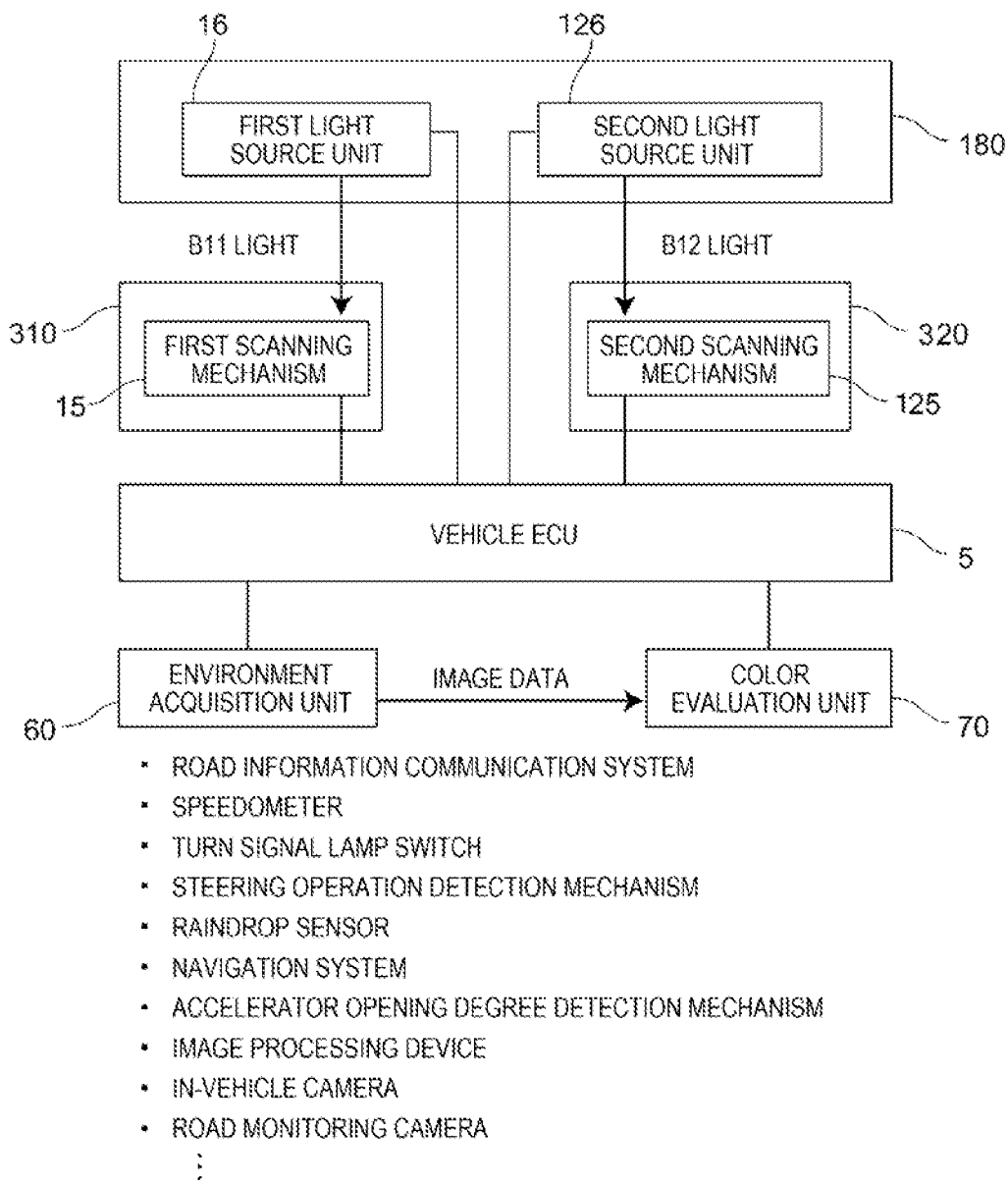
FIG. 22 is a block diagram of the head-up display system according to the fourth embodiment.

FIG. 22 is a block diagram of the head-up display system 300. A projection control unit of the head-up display device 320 and a light distribution control unit of the variable light distribution device 310 are integrated into the vehicle ECU 5, and the vehicle ECU 5 directly controls all components of the head-up display device 320 and the variable light distribution device 310. The vehicle ECU 5 is an example of a light distribution control unit and an image light control unit.

The variable light distribution device 310 has the same configuration as that of the third embodiment except that the light B11 is supplied from the light engine 180 instead of the first light source unit 16 and is directly controlled by the vehicle ECU 5. Similarly, the head-up display device 320 has the same configuration as that of the third embodiment except that the light B12 is supplied from the light engine 180 instead of the second light source unit 126 and is directly controlled by the vehicle ECU 5. The vehicle ECU 5 directly controls the variable light distribution device 310 and the head-up display device 320 in association with each other.

The head-up display system 300 can provide the same effects as those of the third embodiment, and can change the form of the image light according to the form of the light distribution pattern so that the driver can visually recognize information easily.

Although the preferred embodiments and modifications of the present invention have been described above, the above embodiments are merely examples of the present invention, and these embodiments can be combined based on knowledge of those skilled in the art, and such forms are also included in the scope of the present invention.

The present application is based on Japanese Patent Application No. 2019-108333 filed on Jun. 11, 2019 and Japanese Patent Application No. 2019-114849 filed on Jun. 20, 2019, the contents of which are incorporated herein by reference.

The invention claimed is:

1. A method for providing a head-up display in a vehicle including a headlamp, the method comprising:
    emitting white light whose correlated color temperature is changeable by a light source;
    adjusting the correlated color temperature of the white light emitted from the light source; and
    forming image light by the white light emitted from the light source, and projecting the image light onto a projection target member disposed in front of a driver of the vehicle, thereby displaying a virtual image superimposed on a landscape for the driver,
    wherein the correlated color temperature of the white light emitted from the light source is adjusted in accordance with a correlated color temperature of only irradiation light emitted from the headlamp,
    wherein the correlated color temperature of the white light emitted from the light source is adjusted to be always lower than the correlated color temperature of the irradiation light emitted from the headlamp.

2. The method according to claim 1, wherein the correlated color temperature of the white light emitted from the light source is adjusted to be different from the correlated color temperature of the irradiation light emitted from the headlamp by 1000 K or more.

3. The method according to claim 1, wherein the correlated color temperature of the white light emitted from the light source is adjusted to be 4000 K or less.

4. The method according to claim 1, wherein the correlated color temperature of the white light emitted is adjusted by the light source only when the headlamp is lighted.

5. The method according to claim 1, further comprising:
    guiding the white light emitted from the light source to the projection unit by a photoconductor,
    wherein the light source is accommodated in a light engine where a light source of the headlamp is accommodated.

6. The method according to claim 1, wherein the correlated color temperature of the white light emitted from the light source is adjusted in accordance with the correlated color temperature of the irradiation light emitted from the headlamp and a color of an object irradiated by the irradiation light emitted from the headlamp.

7. A method for providing a head-up display in a vehicle, comprising:
    irradiating a front side of the vehicle by a headlamp;
    emitting white light whose correlated color temperature is changeable by a light source;
    adjusting the correlated color temperature of the white light emitted from the light source;
    forming image light by the white light emitted from the light source, and projecting the image light onto a projection target member disposed in front of a driver of the vehicle, thereby displaying a virtual image superimposed on a landscape for the driver,
    wherein the correlated color temperature of the white light emitted from the light source is adjusted in accordance with a correlated color temperature of only irradiation light emitted from the headlamp,
    wherein the correlated color temperature of the white light emitted from the light source is adjusted to be always lower than the correlated color temperature of the irradiation light emitted from the headlamp.

8. A method comprising:
    acquiring information on a vehicle;
    forming a desired light distribution pattern around the vehicle;
    determining a light distribution mode and controlling a variable light distribution device;
    projecting desired information as image light onto a projection target member disposed in front of a driver of the vehicle, thereby displaying a virtual image superimposed on a landscape for the driver; and
    determining a form and a projection position of the image light and controlling the projecting of desired information as image light such that a correlated color temperature of the image light emitted from the variable light distribution device is adjusted to be always lower than a correlated color temperature of an irradiation light emitted from a headlamp.

9. The method according to claim 8, further comprising:
    specifying a representative color based on a color distribution,
    wherein a representative color of a place where the correlated color temperature of the image light is projected around the vehicle is specified based on the information on the vehicle, and
    at least a part of a color of the image light projected is displayed as information for alerting the driver in a color opposite to the specified representative color.

10. The method according to claim 8, further comprising:
    emitting light by a light source of a light engine; and
    supplying light emitted from the light source of a light engine to the variable light distribution device and the head-up display device.

* * * * *